US012192719B2

(12) United States Patent
Davis et al.

(10) Patent No.: US 12,192,719 B2
(45) Date of Patent: Jan. 7, 2025

(54) AUDIO LEVEL ADJUSTMENT BASED ON UWB

(71) Applicant: Motorola Mobility LLC, Chicago, IL (US)

(72) Inventors: Giles T. Davis, Downers Grove, IL (US); Michael E. Russell, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 135 days.

(21) Appl. No.: 17/708,410

(22) Filed: Mar. 30, 2022

(65) Prior Publication Data

US 2023/0319475 A1 Oct. 5, 2023

(51) Int. Cl.
*G06F 3/16* (2006.01)
*H04R 5/04* (2006.01)
*H04W 4/029* (2018.01)
*H04W 4/80* (2018.01)

(52) U.S. Cl.
CPC .............. *H04R 5/04* (2013.01); *G06F 3/165* (2013.01); *H04W 4/029* (2018.02); *H04W 4/80* (2018.02); *H04R 2430/01* (2013.01); *H04R 2499/11* (2013.01)

(58) Field of Classification Search
CPC ... H04R 3/12; H04R 2420/07; H04R 2430/01
USPC ............................... 381/77, 79–80, 104–109
See application file for complete search history.

(56) References Cited

U.S. PATENT DOCUMENTS

| | | | |
|---|---|---|---|
| 10,123,142 B2 * | 11/2018 | Lee | H04S 7/308 |
| 10,484,832 B1 | 11/2019 | Tyagi et al. | |
| 10,499,194 B1 | 12/2019 | Tyagi et al. | |
| 10,869,166 B2 | 12/2020 | Tyagi et al. | |
| 11,051,260 B2 | 6/2021 | Gorsica et al. | |
| 11,520,550 B1 * | 12/2022 | Bushnell | H04R 5/04 |
| 11,669,297 B2 * | 6/2023 | Dong | H04N 21/43637 700/94 |
| 11,729,551 B2 * | 8/2023 | Ahmed | H04R 3/12 381/77 |

(Continued)

OTHER PUBLICATIONS

Russell, Michael E, et al., "US Application as Filed", U.S. Appl. No. 18/097,611, filed Jan. 17, 2023, 71 pages.

(Continued)

*Primary Examiner* — Disler Paul
(74) *Attorney, Agent, or Firm* — FIG. 1 Patents

(57) ABSTRACT

In aspects of audio level adjustment based on UWB, a wireless device includes an ultra-wideband (UWB) radio to communicate with UWB radios respectively associated with speakers emitting audio. The UWB radio can receive UWB ranging data from the UWB radios associated with the speakers. An audio controller can utilize the UWB ranging data to monitor locations of the wireless device relative to the speakers and determine a location change of the wireless device relative to the speakers. The audio controller can communicate audio adjustment instructions based on the locations of the wireless device relative to the speakers or relative to the location change of the wireless device. The audio adjustment instructions can initiate an adjustment of a sound level of the audio emitted from at least one of the speakers and/or initiate a delay in the audio emitted from at least one of the speakers.

20 Claims, 7 Drawing Sheets

(56) References Cited

U.S. PATENT DOCUMENTS

| | | | | |
|---|---|---|---|---|
| 2012/0230525 A1* | 9/2012 | Higuchi | ............... | H04N 21/439 381/303 |
| 2014/0375531 A1* | 12/2014 | Latypov | ............. | G02B 27/0172 381/310 |
| 2015/0230040 A1* | 8/2015 | Squires | ................... | H04S 7/302 381/303 |
| 2016/0021481 A1* | 1/2016 | Johnson | ................... | H04R 5/04 381/303 |

OTHER PUBLICATIONS

"[Update] Introducing the New Galaxy SmartTag+: The Smart Way to Find Lost Items", Samsung US Newsroom [online][retrieved Jun. 29, 2021]. Retrieved from the Internet <https://news.samsung.com/us/introducing-the-new-galaxy-smarttag-plus/>., May 11, 2021, 8 Pages.

"Car Connectivity Consortium", Car Connectivity Consortium [retrieved Jun. 28, 2021]. Retrieved from the Internet <https://carconnectivity.org/>., Feb. 22, 2018, 6 Pages.

"FiRa Consortium, Inc.", FiRa Consortium, Inc. [retrieved Jun. 28, 2021]. Retrieved from the Internet <https://www.iraconsortium.org/>., Aug. 1, 2019, 3 Pages.

"IEEE Standard for Low-Rate Wireless Networks—Amendment 1: Enhanced Ultra Wideband (UWB) Physical Layers (PHYs) and Associated Ranging Techniques", IEEE 802.15.4z-2020 [retrieved Nov. 16, 2022]. Retrieved from the Internet <10.1109/IEEESTD.2020.9179124>., Aug. 25, 2020, 174 Pages.

"Proximity Profile (PXP)", Bluetooth SIG, Inc. [retrieved Nov. 18, 2022]. Retrieved from the Internet <https://www.bluetooth.com/specifications/specs/proximity-profile-1-0-1/>., Jan. 25, 2022, 11 Pages.

"Proximity Profile 1.0.1", Bluetooth SIG, Inc. [retrieved Nov. 18, 2022]. Retrieved from the Internet <https://www.bluetooth.com/specifications/specs/proximity-profile-1-0-1/>., Jul. 14, 2015, 20 Pages.

"Test Suite (TS)", Bluetooth SIG, Inc. [retrieved Nov. 18, 2022]. Retrieved from the Internet <https://www.bluetooth.com/specifications/specs/proximity-profile-1-0-1/>., Jul. 29, 2019, 23 Pages.

"Tile Bluetooth Tracking Device", Tile Inc. [retrieved Jun. 28, 2021]. Retrieved from the Internet <https://www.thetileapp.com/en-us/how-it-works>., 2012, 18 Pages.

Haselton, Todd , "Here's how Apple's AirTag trackers compare to Tile, and why the company is so upset with Apple", CNBC [online][retrieved Jun. 29, 2021]. Retrieved from the Internet <https://www.cnbc.com/2021/04/27/apple-airtags-versus-tile-tracker-how-they-compare.html>., Apr. 27, 2021, 8 Pages.

Pirch, Hans-Juergen , et al., "Introduction to Impulse Radio UWB Seamless Access Systems", FiRa Consortium [retrieved Jun. 28, 2021]. Retrieved from the Internet <https://www.firaconsortium.org/sites/default/files/2020-04/fira-Introduction-impulse-radio-uwb-wp-en.pdf>., Feb. 2020, 15 Pages.

Russell, Michael E, et al., "US Application as Filed", U.S. Appl. No. 17/473,477, filed Sep. 13, 2021, 61 pages.

Russell, Michael E, et al., "US Application as Filed", U.S. Appl. No. 17/473,671, filed Sep. 13, 2021, 62 pages.

\* cited by examiner

AUDIO LEVEL ADJUSTMENT BASED ON UWB

BACKGROUND

Ultra-wideband (UWB) is a radio technology that can be utilized for secure, spatial location applications using very low energy for short-range, high-bandwidth communications. The technology is detailed by the IEEE 802.15.4z standard for Enhanced Ultra-Wideband (UWB) Physical Layers (PHYs) and Associated Ranging Techniques for accurate relative position tracking, which provides for applications using relative distance between entities. Notably, UWB utilizes double-sided, two-way ranging between devices and provides for highly precise positioning, within 10 cm of ranging accuracy in as little as three degrees of precision through time-of-flight (ToF) and angle-of-arrival (AoA) measurements at up to 100 m through the use of impulse radio communications in the 6-10 GHz frequency range. The positioning is an accurate and secure technology using the scrambled timestamp sequence (STS), cryptographically secure pseudo-random number generation, and other features of the UWB PHY.

BRIEF DESCRIPTION OF THE DRAWINGS

Implementations of the techniques for audio level adjustment based on UWB are described with reference to the following Figures. The same numbers may be used throughout to reference like features and components shown in the Figures.

DETAILED DESCRIPTION

Figure 1:
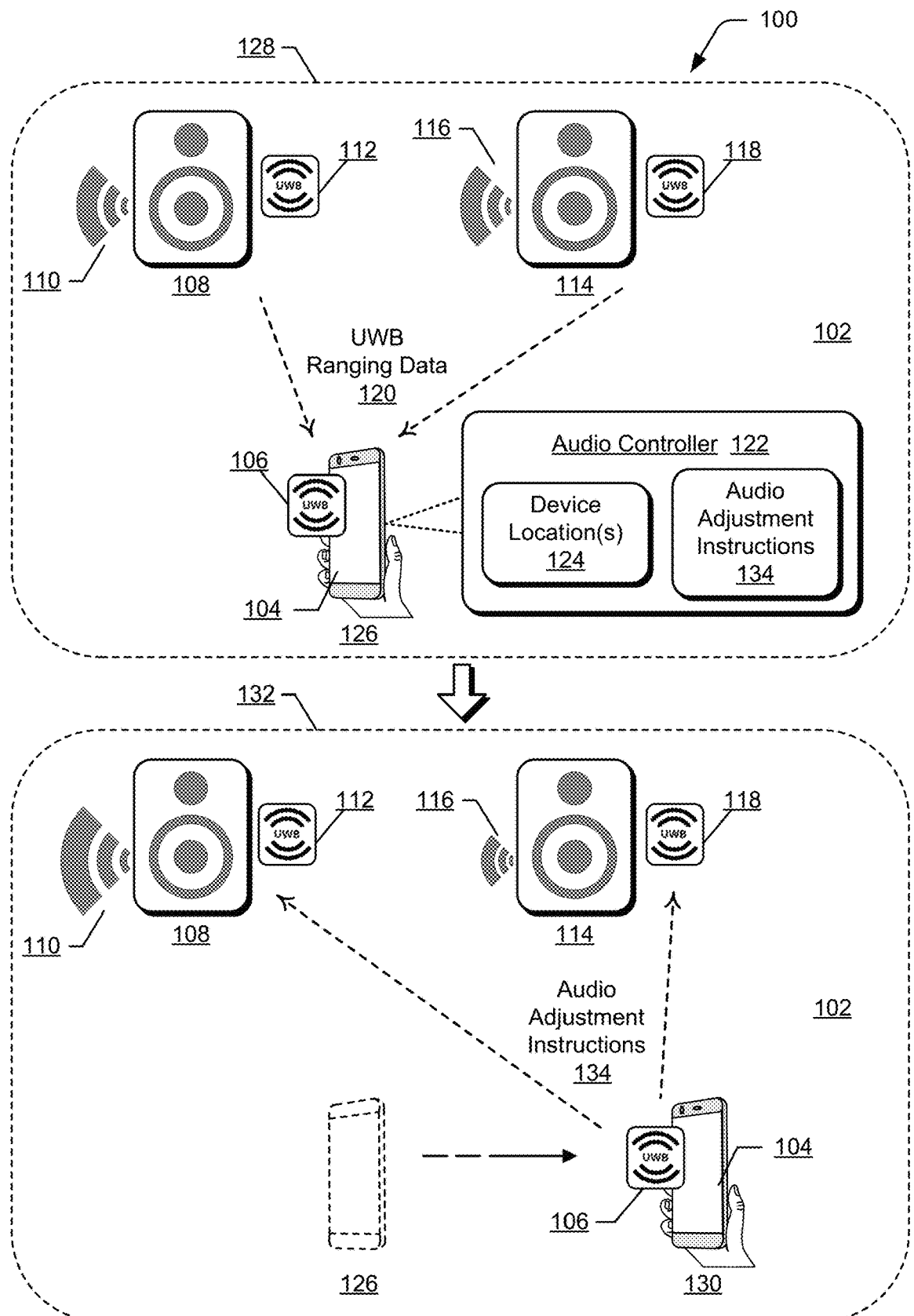
FIG. 1 illustrates example devices and features for audio level adjustment based on UWB in accordance with one or more implementations as described herein.

Implementations of techniques for audio level adjustment based on UWB are implemented utilizing ultra-wideband (UWB) radios as described, and provide techniques that can be implemented by any type of wireless devices, such as smart devices, mobile devices (e.g., cellular phones, tablet devices, smartphones, wireless devices), consumer electronics, media devices, and the like. Generally, UWB-enabled wireless devices, such as smartphones, can be used to determine audio adjustment instructions based on device locations of the wireless device.

In aspects of the described techniques, a system includes a wireless device embedded with a UWB radio, and speakers associated with one or more UWB radios. The speakers may be emitting audio in an environment that also includes the wireless device. Generally, the speakers can be embedded with a UWB radio for UWB communications such that the speakers are UWB-enabled. In other implementations, UWB tags include a UWB radio and can be placed in the environment for association with respective speakers. The tags can be placed in the environment proximate speakers for association with the speakers. In implementations, a single UWB tag can be placed at a fixed location to facilitate accurate location monitoring of the wireless device relative to the speakers in the environment. Similarly each speaker in the environment can be associated with a single UWB radio, either embedded in the speaker or embedded in a UWB tag to be associated with a speaker.

The described techniques can utilize UWB ranging data, such as time-of-flight (ToF), angle-of-arrival (AoA), and/or time-difference-of-arrival (TDoA), as well as Wi-Fi and/or Bluetooth RSSI measurements, to determine UWB radio and UWB tag locations in the environment. The UWB precise location positioning capabilities is utilized to enable location detection of the UWB radios and UWB tags at particular locations in the environment, which can then be used to enhance an audio listening experience of a user in the environment.

The system can include an audio controller, such as implemented by a wireless device in the environment. The audio controller may utilize the UWB ranging data to determine locations of the UWB radios relative to each other in the environment. The audio controller may utilize relative positions of the UWB radios to monitor the device locations of the wireless device relative to the speakers in the environment as the wireless device is moved around within the environment. The audio controller may determine a location change of the wireless device and communicate audio adjustment instructions to one or more devices in the environment in order to initiate sound level adjustments of the audio emitting from the speakers in the environment. For example, the audio controller can automatically decrease (make quieter) the audio level of the audio emitting from speakers that are closer to the wireless device, and/or increase (make louder) the audio emitting from the speakers that are further from the wireless device.

Generally, the audio adjustment at any one or more of the speakers in the environment can include a decrease in the volume of a speaker that a user may be getting closer to (approaching) and/or include an increase in the volume of a speaker that the user is moving away from. An opposite scenario may also be implemented, where the audio is faded from a speaker that the user is moving away from, and the audio is increased at a speaker that the user is approaching. For example, a user may be leaving one room in a home environment and entering into another room. The audio from the speakers in the different rooms may be adjusted so that the volume of the audio from the speaker in the room the user is entering is increased as the user approaches, and the volume of the audio from the speaker in the room that the user is leaving is decreased (e.g., a fading audio scenario). Notably, different implementations of the described disclosure account for speaker audio adjustments that can be initiated to decrease the volume of a speaker that a user is approaching and increase or maintain the volume of the speaker that the user is moving away from, or vice-versa, where the volume is increased at the speaker that the user is approaching and the volume is decreased at the speaker that the user is moving away from.

The audio adjustment instructions may be communicated to one or more of the speakers in the environment or to a device controlling the audio emitting from the speakers, such as an amplifier device. Notably, an advantage of automatically adjusting the audio of the speakers based on a location of a user who is associated with the wireless device is that this process effectively cuts out user involvement in the audio adjustment process. Manually adjusting the levels, tuning, and/or timing of audio can be inefficient, and if done incorrectly, can decrease the enjoyment of the audio experience. Alternatively or in addition to audio adjustment instructions being communicated to the speakers, or to an amplifier or controlling device that may control the audio emitting from the speakers in the environment, the audio adjustment instructions may be utilized to adjust audio from the wireless device as the source of the media that results in the audio being emitted from the speakers. For example, the wireless device may communicate an audio data stream for playback through the speakers, such as in a Bluetooth broadcast implementation, a home networking environment, or similar, and the audio adjustment instructions can control the volume at the wireless device to adjust the audio level of the audio that is emitted from the speakers in the environment.

In implementations, the audio controller may determine the sound level adjustments based on a ratio of subsequent distances to reference distances. For example, the audio controller may determine or receive user input, such as from an application user interface, specifying a current device location as a reference location. The audio controller can store the reference location as data including reference distances from the wireless device to the speakers in the environment. When the audio controller determines the wireless device has moved from the reference location to a subsequent location, the audio controller can determine subsequent distances from the wireless device to the speakers in the environment that make up the subsequent location. The audio controller may then determine sound level adjustments to be included in audio adjustment instructions based on a ratio of subsequent distances to corresponding reference distances. As an example, the audio controller may determine sound level adjustments for audio emitting from a first speaker based on a ratio of a subsequent distance from the wireless device to the first speaker and a reference distance from the wireless device to the first speaker, then repeat the process for the rest of the speakers in the environment. Notably, an advantage of using this described ratio to determine sound level adjustments is that the audio controller does not initiate sound level adjustments when a user is in their preferred reference position listening to audio.

In implementations, the audio controller may determine the sound level adjustments based on a ratio of subsequent distances to an average distance. For example, the audio controller may determine or receive user input, such as from an application user interface, specifying to determine sound level adjustments using an average position. The audio controller can monitor the device location of the wireless device relative to the speakers in the environment and determine that the wireless device is located at a position that is not equidistant to each speaker. The audio controller may then determine the average distance from the wireless device to all of the speakers in the environment, as well as subsequent distances from the wireless device to each of the speakers in the environment. The audio controller can then determine sound level adjustments to be included in audio adjustment instructions based on a ratio of a corresponding subsequent distance to the average distance. For example, the audio controller can determine an average position from the wireless device to all of the speakers in the environment that includes a distance from the wireless device to a first speaker. The audio controller can determine sound level adjustments for the first speaker based on the ratio of the distance to the first speaker and the average distance to all the speakers, then repeat the process for the rest of the speakers. Notably, an advantage of using this described ratio to determine sound level adjustments is that the system does not need to store and recall any initial conditions.

In implementations, the audio controller can determine sound delay adjustments to be included in audio adjustment instructions. The audio controller can determine the number of speakers emitting audio in the environment based on the device locations and the relative positions of the UWB radios. If the audio controller determines that there are two speakers in the environment, the audio controller can delay the audio of the speaker that is nearer the wireless device. The delay can be based on the distance from the wireless device to the left speaker and the distance from the wireless device to the right speaker. The audio controller can determine the sound delay based on the difference between the distance to the right speaker and the distance to the left speaker. If the audio controller determines that there are more than two speakers in the environment, the audio controller may define the device locations of the wireless device using reference distances and subsequent distances, as described above. The audio controller may add delay to the speakers that have a shorter subsequent distance than the reference distance. The sound delay adjustment can be based on the difference between the reference distance and the subsequent distance. Notably, an advantage to automatically adding delay to nearer speakers is that the audio will arrive at the wireless device, and consequently the user, at a coincident time, thus improving the audio experience for the user. In the event that a location change of the wireless device in the environment results in the most distal speaker becoming more distal, there may be an instance where a new device location is also further from an additional speaker, and the additional speaker would also still receive a delay adjustment as part of the audio adjustment instructions. In this scenario, the audio controller may add a delay to the speaker that is closer to the wireless device, if the distance to the closer speaker does not increase as much as the increase in the distance to the speaker that is farther away from the wireless device.

In implementations, the audio controller can receive instructions, such as an input from a user via an application user interface, to modify audio adjustment instructions. For example, the audio controller may modify the audio adjustment instructions to conform to a specified minimum sound level and/or a maximum sound level. This can include the audio controller determining sound level adjustments and modifying the sound level adjustments based on a minimum sound level and/or a maximum sound level. For example, the audio controller can determine, or receive user input via an application user interface specifying the minimum sound level as −20 dB and the maximum sound level as +3 dB. If one of the sound level adjustments reduces the sound level of a speaker lower than −20 dB, the audio controller can modify the sound level adjustments to reduce the sound level to −20 dB. Similarly, if one of the sound level adjustments increases the sound level of a speaker higher than +3 dB, the audio controller can modify the sound level adjustment to increase the sound level to +3 dB. Notably, an advantage of using minimum and maximum sound level adjustments is that the audio level will not be decreased to the point of entirely shutting a speaker down, and audio will not be increased to the point of damaging the speaker.

In implementations, the audio controller may determine, or receive user input via an application user interface, to specify the sound level adjustments as reduce-only sound level adjustments. This can include the audio controller determining sound level adjustments normally as described above. Then the audio controller will determine the largest required gain in sound level and shift all of the sound level adjustments down by the largest required gain. For example, the audio controller may determine sound level adjustments for multiple speakers in an environment and determine the highest required sound level gain as +4 dB. The audio controller can then shift all of the sound level adjustments down by 4 dB such that the speaker that required the +4 dB sound level gain will not be adjusted at all, and all other sound level adjustments will be lowered such that they only reduce the sound level of the audio in the speakers. Notably, an advantage of the reduce-only sound level adjustment option is that a user may not prefer the audio being any louder, and may not want to increase the audio level from any of the speakers. This option accommodates these audio level preferences while still maintaining the relative levels between the speakers.

While features and concepts of the described techniques for audio level adjustment based on UWB can be implemented in any number of different devices, systems, environments, and/or configurations, implementations of the audio level adjustment based on UWB are described in the context of the following example devices, systems, and methods.

FIG. 1 illustrates an example 100 for audio level adjustment based on UWB, as described herein. In this example 100, an environment 102 includes a wireless device 104, which can be utilized to implement features and techniques of audio adjustment based on locations of the wireless device 104 in the environment. The wireless device 104 may include any type of mobile device such as a smartphone, a mobile phone, or other type of mobile wireless device. Alternatively or in addition, the environment 102 can include wireless device 104 as any type of wearable device such as a smart watch, a wearable 5G article, or any other type of wearable wireless device. Alternatively or in addition, the environment 102 can include the wireless device 104 as any type of a wireless electronic, computing, and/or communication device, such as a laptop device, a tablet, a smart device, and so forth. In this example 100, the wireless device 104 is UWB-enabled and includes an embedded UWB radio 106.

In implementations, the wireless device 104 may be communicatively linked, generally by wireless connection, to UWB radios embedded in UWB tags and/or to other UWB-enabled speakers for UWB communication in the environment 102. Generally, the environment 102 can include the wireless device 104, a speaker 108 emitting audio 110 associated with a UWB radio 112 for communication utilizing UWB, and a speaker 114 emitting audio 116 associated with UWB radio 118 for communication utilizing UWB. The UWB radio 112 may be embedded in a UWB tag placed in the environment 102 proximate the speaker 108, or the speaker 108 may be embedded with the UWB radio 112 such that speaker 108 is UWB-enabled. Similarly, UWB radio 118 may be embedded in a UWB tag placed in the environment 102 proximate the speaker 114, or the speaker 114 may be embedded with the UWB radio 118 such that the speaker 114 is UWB-enabled. The wireless UWB communications in the environment 102 are similar between the UWB tags and/or other UWB-enabled speakers in the environment. Given the angular precision and centimeter accurate ranging that UWB provides, location detection of UWB radios at locations in the environment 102 can be used to enhance an audio experience for a user in the environment.

In implementations, the UWB radio 106 embedded with the wireless device 104 receives UWB ranging data 120 from one or more of the UWB radios in the environment 102, such as from the UWB radio 112 and/or from the UWB radio 118 associated with the respective speakers 108, 114. In this example 100, the UWB radio 106 embedded in the wireless device 104 is communicatively linked to the UWB radio 112 associated with the speaker 108 and to the UWB radio 118 associated with the speaker 114. The UWB radio 106 embedded in the wireless device 104 can receive UWB ranging data 120 from the UWB radio 112 associated with the speaker 108. Similarly, the UWB radio 106 embedded in the wireless device 104 can receive the UWB ranging data 120 from the UWB radio 118 associated with the speaker 114. The UWB radio 106 embedded in the wireless device 104 can receive UWB ranging data, such as time-of-flight (ToF), angle-of-arrival (AoA), and/or time-difference-of-arrival (TDoA) data, as received from the UWB radio 112 associated with the speaker 108 and/or from the UWB radio 118 associated with the speaker 114. The time-of-flight (ToF) is a two-way communication between a UWB radio (e.g., UWB radio 106, UWB radio 112, and/or UWB radio 118) and another device, while time-difference-of-arrival (TDoA) is one-way communication, where the UWB radio (e.g., UWB radio 106, UWB radio 112, and/or UWB radio 118) communicates a signal but does not need to wait for a reply, such as from the wireless device 104.

The wireless device 104 can also implement any number of device applications and/or modules, such as any type of a messaging application, communication application, media application, and/or any other of the many possible types of device applications or application modules. In this example 100, the wireless device 104 implements an audio controller 122 which may include independent processing, memory, and/or logic components functioning as a computing and/or electronic device integrated with the wireless device 104. Alternatively or in addition, the audio controller 122 can be embedded in software, in hardware, or as a combination of software and hardware components. In this example, the automation controller 122 is implemented as a software application or module, such as executable software instructions (e.g., computer-executable instructions) that are executable with a processor of the wireless device 104 to implement the techniques and features described herein.

In implementations, the audio controller 122 can utilize the UWB ranging data 120 received by the UWB radio 106 embedded in the wireless device 104 to monitor device location(s) 124 of the wireless device 104 relative to the speakers in the environment, such as relative to the speaker 108 and/or the speaker 114. As noted above, the UWB ranging data 120 may be received from the UWB radios in the environment 102, such as from the UWB radio 112 associated with the speaker 108 and/or from the UWB radio 118 associated with the speaker 114. The audio controller 122 can monitor the device location(s) 124 of the wireless device 104 relative to the speaker 108 and relative to the speaker 114 based on the UWB ranging data 120 received from the UWB radios.

In aspects of audio level adjustment based on UWB, the audio controller 122 can determine that the wireless device 104 is located at a first location 126 in the environment 102 by monitoring the device location(s) 124 of the wireless device. In this example 100, the environment 102 is represented in a first instance 128. In this first instance 128, the audio controller 122 utilizes the UWB ranging data 120 from the UWB radio 112 associated with the speaker 108 and from the UWB radio 118 associated with the speaker 114 to monitor the device location(s) 124 of the wireless device 104 relative to the speakers. As part of monitoring the device location(s) 124 of the wireless device 104, the audio controller 122 may determine that the wireless device 104 is located at the first location 126 relative to the speaker 108 and relative to the speaker 114, as shown in the first instance 128 of the environment.

In implementations, the audio controller 122 can also determine that the wireless device 104 is located at a second location 130 in the environment 102 by monitoring the device location(s) 124 of the wireless device 104, such as represented in second instance 132 of the environment. In this second instance 132, the audio controller 122 utilizes the UWB ranging data 120 from the UWB radio 112 associated with the speaker 108 and from the UWB radio 118 associated with the speaker 114 to monitor the device location(s) 124 of the wireless device 104 relative to the speakers. As part of monitoring the device location(s) 124 of the wireless device 104, the audio controller may determine that the wireless device 104 is located at the second location 130 relative to the speaker 108 and relative to the speaker 114, as shown in the second instance 132 of the environment.

In aspects of audio level adjustment based on UWB, the audio controller 122 can communicate audio adjustment instructions 134 to one or more devices in the environment 102, such as based on the determined device location(s) 124 of the wireless device. The audio adjustment instructions 134 may be generated to initiate a sound level adjustment of audio emitting from speakers in the environment 102, such as the audio 110 emitting from the speaker 108 and/or the audio 116 emitting from the speaker 114. In this example 100, the audio controller 122 may monitor the device location(s) 124 of the wireless device 104 relative to the speakers 108, 114 based on the UWB ranging data 120 received from the respective UWB radios 112, 118 associated with the respective speakers. Based on the device location(s) 124, the audio controller 122 can determine that the wireless device 104 has made a location change by moving from the first location 126 to the second location 130 in the environment (as indicated in the transition from the first instance 128 of the environment to the second instance 132). The audio controller 122 can then communicate the audio adjustment instructions 134 based on the device location(s) 124 of the wireless device 104, indicating that the device has moved from the first location 126 to the second location 130.

In aspects of audio level adjustment based on UWB, the audio adjustment instructions 134 can include initiating sound level adjustments of the audio emitting from one or more speakers in the environment 102, such as the audio 110 emitting from the speaker 108 and/or the audio 116 emitting from the speaker 114. As noted above, the audio adjustment instructions 134 may be based on the device location(s) 124 and/or a location change of the wireless device 104 determined by the audio controller 122. In implementations, the audio adjustment instructions 134 may initiate to reduce the sound level of audio emitting from speaker(s) in the environment 102 based on the device location(s) 124, and/or initiate a gain in the sound level of audio emitting from speaker(s) in the environment 102 based on the device location(s) 124. In this example 100, based on the audio controller 122 determining that the wireless device 104 has moved from the first location 126 to the second location 130 in the environment, the audio controller 122 communicates the audio adjustment instructions 134 initiating to reduce the sound level of the audio 116 emitting from the speaker 114 and/or initiating a gain in the sound level of the audio 110 emitting from the speaker 108. In implementations the audio controller 122 may communicate the audio adjustment instructions 134 to one or more speakers in the environment 102, such as the speaker 108 and/or the speaker 114. Alternatively or in addition, the audio controller 122 may communicate the audio adjustment instructions 134 to an amplifier controlling audio emitting from the speakers in the environment 102, such as the speaker 108 and/or the speaker 114.

In implementations, the audio controller 122 can define the device location(s) 124 of the wireless device 104 as a distance from the wireless device 104 to at least one speaker in the environment, such as to the speaker 108 and/or to the speaker 114. The distances may be determined from the device location(s) 124 of the wireless device 104 that is based on the UWB ranging data 120 received from the UWB radio 112 associated with the speaker 108 and/or from the UWB radio 118 associated with the speaker 114. The audio controller 122 may determine the device location(s) 124 of the wireless device 104 as reference distance(s) from the wireless device 104 to at least one speaker in the environment 102, such as the speaker 108 and/or the speaker 114. In this example 100, the audio controller 122 monitors the device location(s) 124 of the wireless device 104 based on the UWB ranging data 120 received from the UWB radio 112 associated with the speaker 108 and/or from the UWB radio 118 associated with the speaker 114, and determines that the wireless device 104 is at the first location 126. The audio controller 122 can determine that the first location 126 includes a reference distance from the wireless device 104 to the speaker 108 and a reference distance from the wireless device 104 to the speaker 114. In implementations, the reference distance(s) may be specified by a user, for example via a user interface. Alternatively, the reference distance(s) may be determined automatically by the audio controller 122 based on the device location(s) 124.

The audio controller 122 may also determine the device location(s) 124 of the wireless device as subsequent distance(s) from the wireless device 104 to at least one speaker in the environment 102, such as to the speaker 108 and/or to the speaker 114. In this example 100, the audio controller 122 monitors the device location(s) 124 of the wireless device 104 based on the UWB ranging data 120 received from the UWB radio 112 associated with the speaker 108 and from the UWB radio 118 associated with the speaker 114, and determines that the wireless device 104 is at the second location 130. The audio controller 122 can determine that the second location 130 includes a subsequent distance from the wireless device 104 to the speaker 108 and/or a subsequent distance from the wireless device 104 to the speaker 114.

As noted above, the audio controller 122 can determine audio adjustment instructions 134 to communicate to one or more devices in the environment 102 based on the device location(s) to initiate a sound level adjustment of audio emitting from one or more of the speakers in the environment 102, such as the audio 110 emitting from the speaker 108 and/or the audio 116 emitting from the speaker 114. In implementations, the audio controller 122 may determine the sound level adjustment based on a ratio of subsequent distance(s) to corresponding reference distance(s). In this example 100, the audio controller 122 may determine that the first location 126 includes a reference distance from the wireless device 104 to the speaker 108 and/or a reference distance from the wireless device 104 to the speaker 114. The audio controller 122 can also determine that the second location 130 includes a subsequent distance from the wireless device 104 to the speaker 108 and/or a subsequent distance from the wireless device 104 to the speaker 114.

The audio controller 122 can then determine a sound level adjustment included in the audio adjustment instructions 134 based on a ratio of subsequent distance(s) to corresponding reference distance(s), such as a ratio of the subsequent distance from the wireless device 104 to the speaker 108 to the reference distance from the wireless device 104 to the speaker 108 and/or based on a ratio of the subsequent distance from the wireless device 104 to the speaker 108 to the reference distance from the wireless device 104 to the speaker 108. As noted above, the audio adjustment instructions 134 may initiate to reduce the sound level of audio emitting from speaker(s) in the environment 102 based on the device location(s) 124, and/or initiate a gain in the sound level of audio emitting from speaker(s) in the environment. In this example 100, the audio adjustment instructions 134 initiate a gain in the audio 110 emitting from the speaker 108 and initiate to reduce the audio 116 emitting from the speaker 114 based on the ratio of the subsequent distance(s) to the corresponding reference distance(s). Notably, the audio adjustment instructions 134 may be generated to reduce the audio of only one of the speakers in the environment without changing the audio level being emitted from the other speakers. Similarly, the audio adjustment instructions 134 may be generated to initiate a gain of only one of the speakers in the environment without changing the audio level being emitted from the other speakers. As noted, the audio level of any one or more of the speakers in the environment may be reduced, increased, and/or maintained, or any combination thereof.

In implementations, the audio controller 122 can determine the device location(s) 124 of the wireless device 104 as an average distance from the wireless device 104 to all of the speakers in the environment 102, such as to the speaker 108 and to the speaker 114. The average distance may be determined from the device location 124 of the wireless device 104, based on the UWB ranging data 120 received from the UWB radios 112, 118 associated with the respective speakers 108, 114. In this example 100, the audio controller 122 can determine that the device location 124 of the wireless device 104 is at the second location 130, as indicated in the second instance 132 of the environment. The audio controller 122 can determine that the second location 130 includes an average from the wireless device 104 to the speaker 108 and to the speaker 114. For example, the average distance at location 130 includes the average of the distance from the wireless device 104 to the speaker 108 and the distance from the wireless device 104 to the speaker 114. In implementations, the average distance may be specified by a user, for example via a user interface. Alternatively, the average distance may be determined automatically by the audio controller 122 based on the device location(s) 124.

As noted above, the audio controller 122 may also determine the device location(s) 124 of the wireless device 104 as subsequent distance(s) from the wireless device 104 to at least one speaker in the environment 102, such as the speaker 108 and/or the speaker 114. In this example 100, the audio controller 122 monitors the device location(s) 124 of the wireless device 104 based on the UWB ranging data 120 received from the UWB radios 112, 118 associated with the respective speakers 108, 114, and determines that the wireless device 104 is at the second location 130, as indicated in the second instance 132 of the environment. The audio controller 122 can determine that the second location 130 includes a subsequent distance from the wireless device 104 to the speaker 108 and a subsequent distance from the wireless device 104 to the speaker 114.

In implementations, the audio controller 122 may determine the sound level adjustment based on a ratio of subsequent distance(s) to an average distance. In this example 100, the audio controller 122 may determine that the second location 130 includes an average distance from the wireless device 104 to the speakers in the environment 102, such as the speaker 108 and the speaker 114. The audio controller 122 may also determine that the second location 130 includes a subsequent distance from the wireless device 104 to the speaker 108 and a subsequent distance from the wireless device 104 to the speaker 114. The audio controller 122 may determine a sound level adjustment included in the audio adjustment instructions 134 based on a ratio of subsequent distance(s) to the average distance. For example, the audio controller 122 may determine a sound level adjustment by taking the ratio of the subsequent distance to the average distance, where the subsequent distance is determined as the distance from the wireless device 104 to the speaker 108.

Similarly, the audio controller 122 may determine a different sound level adjustment by taking the ratio of the subsequent distance to the average distance, where the subsequent distance is determined as the distance from the wireless device 104 to the speaker 114. As noted above, the audio adjustment instructions 134 may initiate to reduce the sound level of audio emitting from speaker(s) in the environment 102 based on the device location(s) 124, and/or initiate a gain in the sound level of audio emitting from speaker(s) in the environment. In this example 100 at the second instance 132, the audio adjustment instructions 134 initiate a gain in the sound level of the audio 110 emitting from the speaker 108 and initiate to reduce the sound level of the audio 116 emitting from the speaker 114 based on the ratio of the corresponding subsequent distances to the average distance.

In implementations, the audio controller 122 may determine how many speakers are emitting audio in the environment 102 based on the UWB ranging data 120, the device locations 124, and other speaker identifying information. In an event the audio controller 122 determines that there are two speakers emitting audio in the environment 102, the audio controller may label one speaker as "left speaker" and the other speaker as "right speaker." The audio controller 122 may then determine that the device locations 124 include a distance from the wireless device 104 to the left speaker and a distance from the wireless device to the right speaker. The audio controller 122 may then determine and communicate the audio adjustment instructions 134 including a sound level adjustment based on a ratio of the distance to the right speaker to the distance to the left speaker. The sound level adjustment included in the audio adjustment instructions 134 can initiate to reduce the sound level in the audio emitting from the speaker that is nearer the wireless device 104 in the environment 102.

In this example 100, the audio controller 122 may determine the speaker 108 as "left speaker" and the speaker 114 as "right speaker" based on the UWB ranging data 120, the device locations 124, and other speaker identifying information when the wireless device 104 is located at the second location 130. The audio controller 122 may determine the device locations 124 include a distance from the wireless device 104 to the speaker 108 and a distance from the wireless device 104 to the speaker 114. The audio controller 122 may then determine the audio adjustment instructions 134 including a sound level adjustment based on the ratio of the distance to the speaker 114 to the distance to the speaker 108. Based on this ratio, the audio controller 122 can determine that the wireless device 104 at the second location 130 is nearer the speaker 114 than the speaker 108, and communicate audio adjustment instructions 134 to include a sound level adjustment that initiates to reduce the sound level of the audio 116 emitting from the speaker 114 while making no adjustment to the audio 110 emitting from the speaker 108.

In implementations, the audio controller 122 can communicate the audio adjustment instructions 134 to initiate a maximum reduction in a sound level of audio emitting from speaker(s) in the environment 102 and/or initiate a maximum gain in a sound level of audio emitting from speaker(s) in the environment. The sound level adjustment included in the audio adjustment instructions 134 may be based on a ratio of subsequent distance(s) to corresponding reference distance(s). Alternatively or in addition, the sound level adjustment included in the audio adjustment instructions 134 may be based on a ratio of corresponding subsequent distance(s) to an average distance. The sound level adjustment initiated by the audio adjustment instructions 134 may include a minimum reduction in sound level of audio emitting from the speaker(s) in the environment 102, such that the audio emitting from the speaker(s) does not decrease lower than a minimum threshold sound level. Alternatively or in addition, the sound level adjustment initiated by the audio adjustment instructions 134 may include a maximum gain in sound level of audio emitting from the speaker(s) in the environment 102, such that the audio emitting from the speaker(s) does not exceed a maximum threshold sound level. In implementations, the maximum reduction and/or the maximum gain may be specified by a user, such as via a user interface. Alternatively or in addition, the maximum reduction and/or the maximum gain may be determined automatically by the audio controller 122.

In various implementations of audio level adjustment based on UWB, the environment 102 may include the two speakers 108, 114 as shown and described in this example 100, or may include any number of multiple speakers, to include speakers in different rooms, such as in a home environment as further shown and described with reference to FIGS. 3 and 4. Notably, the audio adjustment at any one or more of the speakers in the environment 102 can include a decrease in the volume of the speaker 114 that a user may be getting closer to (approaching) and/or include an increase in the volume of the speaker 108 that the user is moving away from, as indicated by the location change of the wireless device 104 from the first location 126 to the second location 130. An opposite scenario may also be implemented, where the audio is faded from the speaker 108 that the user is moving away from, and the audio is increased at the speaker 114 that the user is approaching. For example, a user may be leaving one room in a home environment and entering into another room. The audio from the speakers in each of the rooms (e.g., as independent running speakers, rather than left and right channel speakers of a stereo setup) may be adjusted so that the volume of the audio from the speaker in the room the user is entering is increased as the user approaches, and the volume of the audio from the speaker in the room that the user is leaving is decreased (e.g., a fading audio scenario). This may include a handoff scenario, where the speaker or speakers in the non-occupied room are effectively "off". Notably, different implementations of the described disclosure account for speaker audio adjustments that can be initiated to decrease the volume of a speaker that a user is approaching and increase or maintain the volume of the speaker that the user is moving away from, or vice-versa, where the volume is increased at the speaker that the user is approaching and the volume is decreased at the speaker that the user is moving away from.

Figure 2:
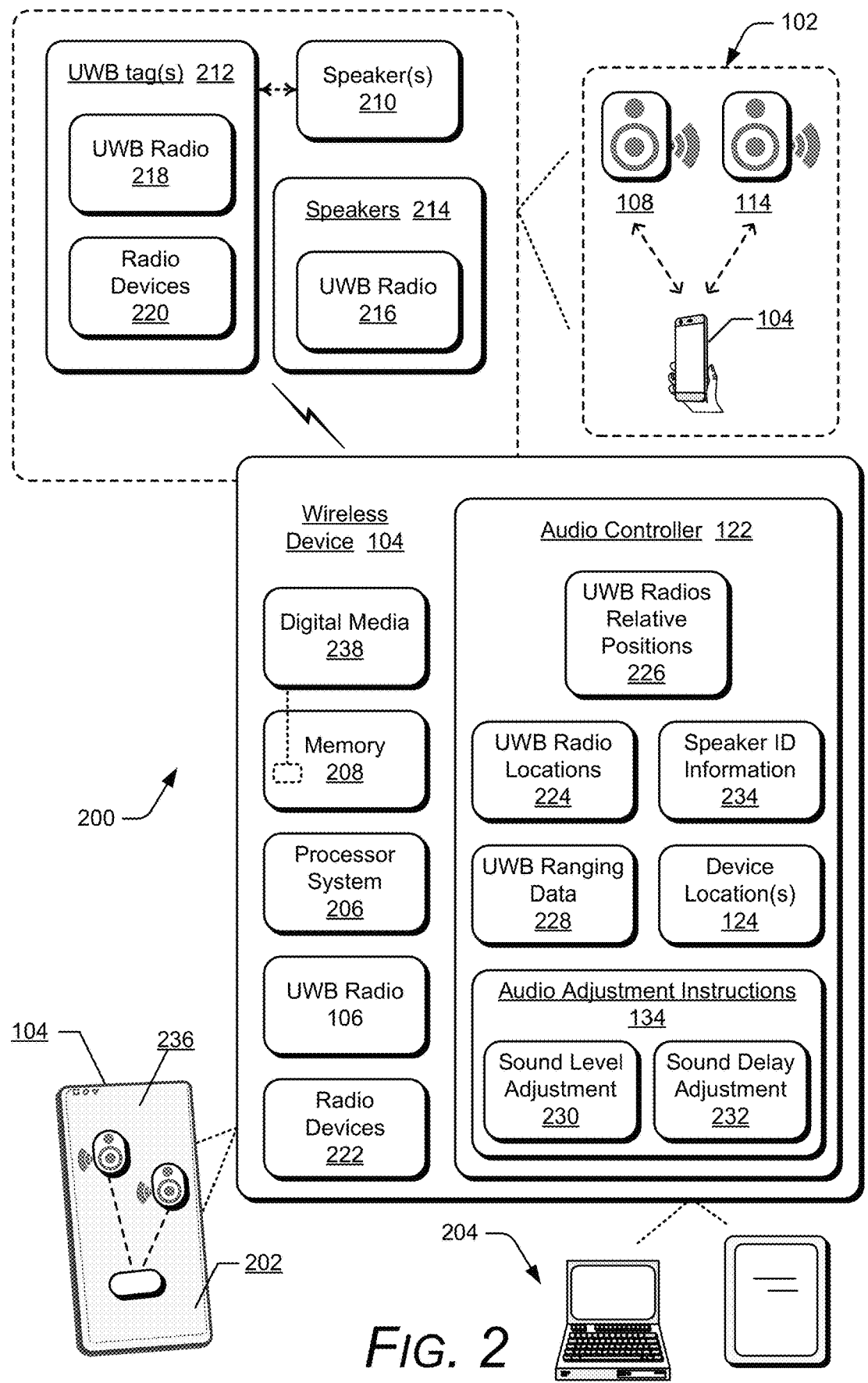
FIG. 2 illustrates example system for audio adjustment based on UWB in accordance with one or more implementations as described herein.

FIG. 2 illustrates an example system 200 for audio level adjustment based on UWB, as described herein. Generally, the system 200 includes the wireless device 104, which can be utilized to implement features and techniques of audio adjustment based on locations of the wireless device in the environment 102, such as shown and described with reference to FIG. 1. In this example system 200, the wireless device 104, such as a smartphone, mobile phone, or other type of mobile wireless device, has a display screen 202 on which an application user interface may be displayed. The system 200 can include the wireless device 104 as any type of a wireless electronic, computing, and/or communication device 204, such as a laptop device, a tablet, a smart device, and so forth. The wireless device 104 can be implemented with various components, such as a processor system 206 and memory 208, as well as any number and combination of different components as further described with reference to the example device shown in FIG. 7. For example, the wireless device 104 can include a power source to power the device, such as a rechargeable battery and/or any other type of active or passive power source that may be implemented in an electronic, computing, and/or communication device.

In implementations, the wireless device 104 may be communicatively linked, generally by wireless connection, to UWB radios of UWB tags and/or to other UWB-enabled speakers for UWB communication in the environment 102, including speakers 108 and 114, as well as the wireless device 104 shown in FIG. 1. Generally, the environment 102 can include the wireless device 104, speaker(s) 210 that have associated UWB tags 212, and/or other speakers 214 implemented with a UWB radio for communication utilizing UWB, as well as any number of the other types of electronic, computing, and/or communication devices 204 described herein. The wireless UWB communications in the environment 102 are similar between the UWB tags 212 and/or other UWB-enabled devices, such as the speakers 214. The UWB tags 212 can be placed in the environment proximate each of the speakers, and then labeled with a functional name to indicate a UWB tag association with a particular speaker. Given the angular precision and centimeter accurate ranging that UWB provides, location detection of the UWB radios and UWB tags 212 at particular locations in the environment can be used to enhance the audio experience for a user in the environment.

In this example system 200, the speakers 214 may be enabled for UWB communications with an embedded UWB radio 216. Alternatively, a UWB tag 212 having a UWB radio 218 may be associated with any other types of speaker 210 that are not UWB-enabled in the environment. For example, the UWB tags 212 can be positioned and located in the environment for association with respective speakers, and each UWB tag 212 can be identified and associated with a speaker 210. In some instances, one or more of the speakers 214 may already be UWB-enabled with a UWB radio 216 for wireless communication with the other speakers, with the UWB tags 212, and/or with any of the UWB-enabled devices in the environment, which may be utilized for location monitoring as the wireless device 104 and/or other devices are moved within the environment. The wireless UWB communications for locating speakers 212 and/or speakers 210 in the environment 102 are similar between the UWB tags 212 and/or the UWB-enabled speakers 214 in the environment. A network of the UWB tags 212 in the environment can discover and communicate between themselves and/or with a control device or controller logic that manages the speakers 210 and UWB tags in the environment, such as an amplifier device. In implementations, a single UWB tag 212 can be used at a fixed location to facilitate accurate location monitoring of speakers in the environment.

In this example system 200, a UWB tag 212 is generally representative of any UWB tag or device with embedded UWB in the environment 102, and can include various radios for wireless communications with other devices and/or with the other UWB tags in the environment. For example, the UWB tag 212 can include the UWB radio 218 and other radio devices 220, such as a Bluetooth radio, and/or a Wi-Fi radio, implemented for wireless communications with the other speakers and UWB tags in the environment. The wireless device 104 also includes various radios for wireless communication with the speakers 214, other speakers 210, and/or with the UWB tags 212 in the environment. For example, the wireless device 104 includes a UWB radio 106 and/or other radio devices 222, such as a Bluetooth radio and a Wi-Fi radio implemented for wireless communications with the other speakers and UWB tags 212 in the environment.

The wireless device 104 can also implement any number of device applications and/or modules, such as any type of a messaging application, communication application, media application, and/or any other of the many possible types of device applications or application modules. In this example system 200, the wireless device 104 implements the audio controller 122 which may include independent processing, memory, and/or logic components functioning as a computing and/or electronic device integrated with the wireless device 104. Alternatively or in addition, the audio controller 122 can be implemented in software, in hardware, or as a combination of software and hardware components. In this example, the audio controller 122 is implemented as a software application or module, such as executable software instructions (e.g., computer-executable instructions) that are executable with a processor (e.g., with the processor system 206) of the wireless device 104 to implement the techniques and features described herein.

As a software application or module, the audio controller 122 can be stored on computer-readable storage memory (e.g., the memory 208 of the device), or in any other suitable memory device or electronic data storage implemented with the module. Alternatively or in addition, the audio controller 122 may be implemented in firmware and/or at least partially in computer hardware. For example, at least part of the modules may be executable by a computer processor, and/or at least part of the modules may be implemented in logic circuitry.

In implementations, and as described above, the wireless device 104 can communicate with the UWB tags 212, the UWB radios 216, 218, and with the other speakers 210 in the environment 102, receiving Bluetooth or BLE advertised communications from the UWB tags and devices. The wireless device implements the audio controller 122, which can correlate a UWB tag 212 with a nearby speaker 210 based on RSSI measurements of the Bluetooth or BLE advertised communications from the UWB tags and speakers. For example, the wireless device 104 can receive advertised signals from the UWB tags 212, the UWB radios 216, 218, and/or the speakers 210, and the audio controller 122 compares the signal path loss from the received signals to determine which of the UWB tags, UWB radios, and speakers are proximate each other based on similar signal path loss. The audio controller can also associate a UWB tag with a nearby speaker, and communicate the association back to the UWB tag, such as via in-band UWB communications.

As noted above, the example system 200 includes the UWB tags 212 located for association with respective speakers 210 in the environment 102, and the objects can include both tagged speakers, as well as non-tagged speakers. In aspects of the described techniques, the audio controller 122 implemented by the wireless device 104 can determine the location of each of the tagged speakers in the environment 102 based on a position of a UWB tag 212 associated with a tagged speaker. The audio controller 122 can also determine a location of each of the speakers and non-tagged speakers based on UWB radio locations 224 in the environment.

In implementations, the audio controller 122 can determine the UWB radio location 224 of each of the UWB tags 212 and UWB radios in the environment 102, and determine the relative positions 226 of each of the UWB radios with respect to each other. The audio controller 122 can obtain UWB ranging data 228, such as time-of-flight (ToF), angle-of-arrival (AoA), and/or time-difference-of-arrival (TDoA) data, as received from the UWB tags 212 and UWB radios via in-band session exchanges with the UWB radio 106 of the wireless device 104. The time-of-flight (ToF) is a two-way communication between a UWB tag 212 and another device, while time-difference-of-arrival (TDoA) is one-way communication, where the UWB tag 212 communicates a signal but does not need to wait for a reply, such as from the wireless device 104. The audio controller 122 may also receive and utilize other communication data that is shared over Bluetooth or BLE, such as relative position data shared between UWB devices. The audio controller 122 can then determine the location 224 and the relative position 226 of each of the UWB tags 212 and UWB radios in the environment 102 based on the UWB ranging data 228. The audio controller 122 can then monitor the device locations 124 of the wireless device 104 relative to the speakers in the environment.

In implementations, the audio controller 122 can determine the audio adjustment instructions 134 based on the device locations 124 of the wireless device 104 relative to speakers in the environment 102 and communicate the audio adjustment instructions to one or more devices in the environment. The audio adjustment instructions 134 may initiate a sound level adjustment 230 of audio emitting from one or more speakers in the environment 102, as further described above with reference to FIG. 1. The audio adjustment instructions 134 can be communicated via Bluetooth or BLE to one or more speakers in the environment 102 and/or to a device, such as an amplifier device controlling the audio emitting from the speakers in the environment. Notably, the audio adjustment instructions 134 can be instructions sent to a speaker or amplifier for gain and/or delay control, or may be preprocessed on an audio stream that is being communicated to the speaker so that the audio output is adjusted accordingly.

For example, the audio controller may receive UWB ranging data 228 to determine the wireless device locations 124 including a relative distance from the wireless device 104 to at least one speaker in the environment 102, an average distance from the wireless device 104 to all of the speakers in the environment, and/or a subsequent distance from the wireless device 104 to the one speaker in the environment. The audio controller 122 may then communicate audio adjustment instructions 134 to initiate a sound level adjustment 230 in audio emitting from the one speaker. The sound level adjustment 230 may initiate to reduce the sound level of the audio emitting from the speaker and/or initiate a gain in the sound level of the audio emitting from the speaker. The determination to reduce or initiate a gain the sound level adjustment 230 can be based on a ratio of the subsequent distance to the reference distance and/or a ratio of the subsequent distance to the average distance determined by the audio controller 122.

In implementations, the audio adjustment instructions 134 may initiate a sound delay adjustment 232 of audio emitting from one or more speakers in the environment 102. The audio adjustment instructions 134, including the sound delay adjustment 232, can be communicated via Bluetooth or BLE to one or more speakers in the environment 102 and/or to a device, such as an amplifier device controlling the audio emitted from the speakers in the environment. The sound delay adjustment 232 can be determined by the audio controller based on speaker identifying information 234, the UWB radios relative positions 226, and/or the wireless device location(s) 124. In implementations, the audio adjustment instructions 134 include being utilized to adjust audio generated from the wireless device 104 as the source of the media that results in the audio being emitted from the speakers. For example, the wireless device 104 may communicate an audio data stream for playback through the speakers 108, 114, such as in a Bluetooth broadcast implementation, a home networking media environment, or similar, and the audio adjustment instructions 134 can control the volume at the wireless device 104 to adjust the audio level of the audio 110, 116 that is emitted from the speakers in the environment.

For example, the audio controller 122 can receive speaker identifying information 234 and determine how many speakers are emitting audio in the environment 102. The audio controller 122 may also receive UWB ranging data 228 and determine the wireless device location(s) 124 of the wireless device relative to the speakers in the environment 102. If the audio controller 122 determines that there are two speakers in the environment 102, the audio controller may utilize speaker identifying information 234, the UWB radios relative positions 226, and/or the wireless device location 124 to label one speaker as "left speaker" and the other speaker as "right speaker." The audio controller 122 may then determine the wireless device location 124 to include a distance from the wireless device 104 to the left speaker and a distance from the wireless device to the right speaker. Then the audio controller 122 can determine the sound delay adjustment 232 based on the difference between the two distances and initiate the sound delay adjustment in the nearer speaker. If the audio controller 122 determines that there are more than two speakers, the audio controller may determine the wireless device locations 124 include a reference distance to corresponding speakers in the environment 102, a subsequent distance to corresponding speakers in the environment, and/or an average distance to all the speakers in the environment. If the audio controller 122 determines that a subsequent distance is less than a reference distance of corresponding speaker(s), the sound delay adjustment 232 can be based on the difference between the subsequent distance and the reference distance to the corresponding speaker(s).

Although the audio controller 122 is shown and described as being implemented by the wireless device 104 in the environment 102, any of the other computing devices in the environment may implement the audio controller 122 and/or an instantiation of the audio controller. For example, the system 200 may include the wireless device 104, which may be an independent electronic, computing, and/or communication device in the environment 102, and the wireless device 104 can implement the audio controller 122. Similarly, a control device or controller logic in the environment 102 can implement the audio controller, as well as a UWB tag 212 may implement the audio controller 122 in the environment.

As a device application implemented by the wireless device 102, the audio controller 122 may have an associated application user interface 236 that is generated and displayed for user interaction and viewing, such as on the display screen 202 of the wireless device 104. Generally, an application user interface 236, or any other type of video, image, graphic, and the like is digital image content that is displayable on the display screen 202 of the wireless device 104, as further described with reference to the example user interface shown in FIG. 5.

In implementations, the audio controller 122 can queue digital media 238 for playback at speakers 210 and/or speakers 214 in the environment 102, and update the audio experience by initiating digital media playback at selected speakers in the environment, such as based on the wireless device location 124 in the environment. For example, an audio experience may include the audio controller 122 initiating a playback of audio to the speakers 210 and/or speakers 214 in the environment 102, in response to the wireless device location(s) 124, including a distance that is within a threshold distance of the wireless device 104 to at least one of the speakers in the environment.

Figure 3:
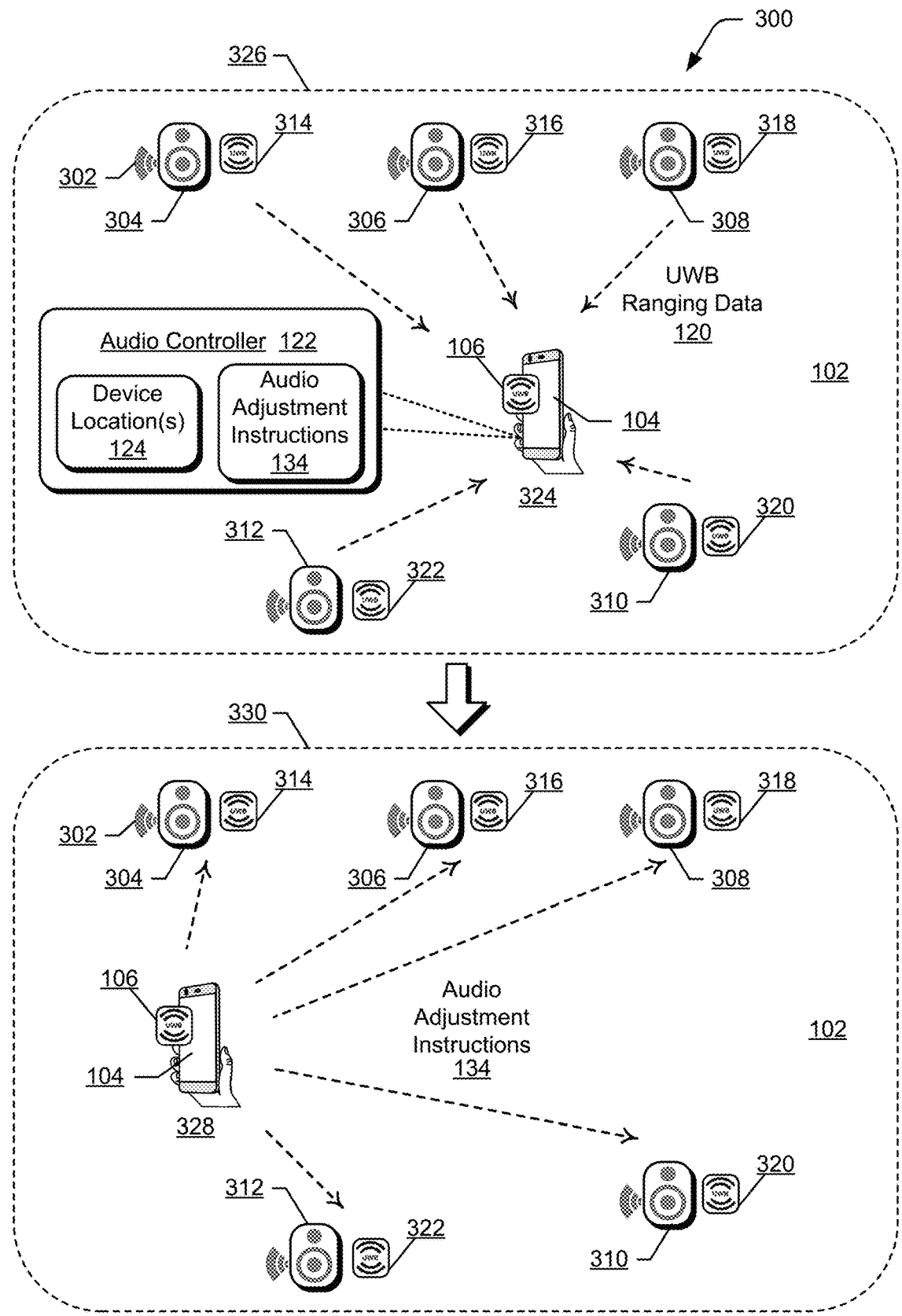
FIGS. 3 and 4 illustrate example devices and features for audio level adjustment based on UWB in accordance with one or more implementations as described herein.

FIG. 3 illustrates an example 300 for audio level adjustment based on UWB, as described herein. In this example 300, the environment 102 includes the wireless device 104, which can be utilized to implement features and techniques of audio adjustment based on locations of the wireless device 104 in the environment. Generally, the environment 102 can include the wireless device 104 and an arbitrary number of speakers emitting audio 302 in the environment. In this example 300, the environment 102 can include the wireless device 104, speakers 304-312 respectively associated UWB radios 314-322 emitting the audio 302 in the environment. The UWB radios 314-322 may be embedded in UWB tags placed in the environment 102 proximate the speakers 304-312, or the speakers 304-312 may be embedded with the UWB radios 314-322 such that the speakers are UWB-enabled.

In implementations, the UWB radio 106 embedded in the wireless device 104 receives UWB ranging data 120 from one or more of the UWB radios in the environment 102, such as from the UWB radios 314-322 associated with respective speakers 304-312. In implementations, the audio controller 122 can utilize the UWB ranging data 120 received by the UWB radio 106 embedded in the wireless device 104 to monitor the device location(s) 124 of the wireless device 104 relative to the speakers in the environment, such as relative to the speakers 304-312.

In aspects of audio level adjustment based on UWB, the audio controller 122 can determine that the wireless device 104 is located at a first location 324 in the environment 102 by monitoring the device location(s) 124 of the wireless device 104. In this example 300, the environment 102 is represented in a first instance 326. In this first instance 326, the audio controller 122 utilizes the UWB ranging data 120 from the UWB radios 314-322 to monitor the device location(s) 124 of the wireless device 104 relative to the speakers 304-312. As part of monitoring the device location(s) 124 of the wireless device 104, the audio controller 122 may determine that the wireless device 104 is located at the first location 324 relative to the speakers 304-312, as shown in the first instance 326 of the environment 102. In implementations, the audio controller 122 can also determine that the wireless device 104 is located at a second location 328 in a second instance 330 of the environment 102 by monitoring the device location(s) 124 of the wireless device 104. As part of monitoring the device location(s) 124 of the wireless device 104, the audio controller may determine that the wireless device 104 is located at the second location 328 relative to the speakers 304-312, as shown in the second instance 330 of the environment 102.

In aspects of audio level adjustment based on UWB, the audio controller 122 can communicate the audio adjustment instructions 134 to one or more devices in the environment 102, such as based on the determined device location(s) 124 of the wireless device. The audio adjustment instructions 134 may be generated to initiate a sound level adjustment of the audio 302 emitting from any of the speakers 304-312. In this example 300, the audio controller 122 may monitor the device location(s) 124 of the wireless device 104 relative to the speakers 304-312 based on the UWB ranging data 120 received from the respective UWB radios 314-322. Based on the device location(s) 124, the audio controller 122 can determine that the wireless device 104 has made a location change by moving from the first location 324 to the second location 328 in the environment (as indicated in the transition from the first instance 326 of the environment to the second instance 330). The audio controller 122 can then communicate the audio adjustment instructions 134 based on the device location(s) 124 of the wireless device 104, indicating that the device has moved from the first location 324 to the second location 328.

In aspects of audio level adjustment based on UWB, the audio adjustment instructions 134 can include initiating sound level adjustments of the audio 302 emitting from one or more speakers in the environment 102. In implementations, the audio adjustment instructions 134 may be initiated to reduce the sound level of the audio 302 emitting from one or more of the speakers 304-312 in the environment 102 based on the device location(s) 124, and/or may initiate a gain in the sound level of audio emitting from one or more speakers in the environment 102 based on the device location(s). The audio controller 122 may communicate the audio adjustment instructions 134 to one or more of the speakers 304-312. Similarly, the audio controller 122 may communicate the audio adjustment instructions 134 to a central device controlling the audio 302 emitting from the speakers 304-312, such as an amplifier device.

In implementations, the audio controller 122 can define the device location(s) 124 of the wireless device 104 as a distance from the wireless device 104 to at least one speaker in the environment 102, as described above in relation to FIG. 1. In this example 300, the audio controller 122 may determine the device locations 124 of the wireless device 104 as reference distances from the wireless device 104 to at least one of the speakers 304-312 when the wireless device is at the first location 324 as shown in the first instance 326. The audio controller 122 can then determine the device locations 124 of the wireless device 104 as subsequent distances from wireless device to at least one of the speakers 304-312 when the wireless device is at the second location 328 as shown in the second instance 330. The audio controller 122 can take the ratio of the subsequent distances to the respective reference distances in order to determine a sound level adjustment of the audio 302 emitting from one or more of the speakers 304-312. This can result in the sound level of the speakers nearer the wireless device 104 being lower than the sound level of the speakers more distal to the wireless device 104. Notably, when the audio controller 122 is configured to use this ratio, it is necessary for the audio controller to recall an initial condition including the reference distances, but not necessary for the audio controller to adjust the audio when a user is in their preferred reference location.

In implementations, the audio controller 122 can define the device location(s) 124 of the wireless device 104 as an average distance from the wireless device 104 to all the speakers 304-312 in the environment 102, as described above in relation to FIG. 1. In this example 300, the audio controller 122 may determine the device locations 124 of the wireless device 104 as an average distance from the wireless device 104 to all of the speakers 304-312 when the wireless device is at the second location 328 as shown in the second instance 330. The audio controller 122 can then determine the device locations 124 of the wireless device 104 as subsequent distances from wireless device to at least one of the speakers 304-312 when the wireless device is at the second location 328 as shown in the second instance 330. The audio controller 122 can take the ratio of the subsequent distances to the average distance in order to determine a sound level adjustment of the audio 302 emitting from the respective speakers 304-312. This can result in the sound level of the speakers with respective subsequent distances that are less than the average distances to receive audio adjustment instructions 134 that initiate to reduce the sound level in the audio 302, while the speakers with respective subsequent distances that are greater than the average distance receive instructions that initiate a gain in the sound level of the audio. Notably, when the audio controller 122 is configured to use this ratio, it is not necessary for the audio controller 122 to recall initial conditions, but it is at times necessary for the audio controller to adjust audio when a user is in their preferred reference position.

In aspects of audio level adjustment based on UWB, the audio controller 122 may communicate the audio adjustment instructions 134 to initiate a delay in the audio 302 emitting from one or more of the speakers 304-312, as further described with reference to FIG. 2. The audio controller 122 can determine the number of speakers emitting audio in the environment 102. In this example 300, the audio controller 122 can determine that there are more than two speakers emitting audio in the environment, such as the speakers 304-312 emitting the audio 302 in the environment 102. The audio controller 122 may then determine the wireless device locations 124 to include reference distances from the wireless device 104 to the speakers 304-312 and subsequent distances from the wireless device to the speakers. The audio controller 122 may communicate the audio adjustment instructions 134 to initiate a delay in speakers where the associated subsequent distance is less than the respective reference distance. The delay can be based on the difference between the reference distance and the respective reference distance.

In implementations, the delay adjustment for the speakers 304-312 in the environment with or without a reference position are detailed in Table T1. For example, in the first instance 326 of the environment, and with "no reference", a max distance and associated ToF can be identified, and the delay in audio at each speaker can be adjusted accordingly as indicated in the "No Ref–Delay (ms)" column for environment instance 326 in Table T1. Alternatively, the distance can be defined as the reference position, and the delay in audio at each speaker is zero, such as when a user may have already incorporated appropriate delays elsewhere in the system. The assumed delay of reference for each speaker is learned, as indicated in the "Assumed Delay (ms)" column in Table T1. In the second instance 330 of the environment, and with "no reference", a max distance and associated ToF can be identified, and the delay in audio at each speaker can be adjusted accordingly as indicated in the "No Ref–Delay (ms)" column for environment instance 330 in Table T1. If there is a defined reference position, the assumed delay can be subtracted from what would be the delay (i.e., the "No Ref–Delay (ms)" column) for a temporary result as indicated in the "Ref–Δ Delay" column, and then normalize the smallest delay set to 0ms, as indicated in the results "Ref–Norm/Apply" column, and apply this delay.

TABLE T1

Delay Adjustment

| | Environment Instance 326 | | | Environment Instance 330 | | | | |
|---|---|---|---|---|---|---|---|---|
| Speaker | Feet | No Ref Delay (ms) | Ref Delay (ms) | Feet | No Ref Delay (ms) | Assumed Delay (ms) | Ref Δ Delay | Ref Norm/ Apply |
| 304 | 10 | 2 | 0 | 8 | 3 | 2 | 1 | 6 |
| 306 | 7 | 5 | 0 | 7 | 4 | 5 | −1 | 4 |
| 308 | 7 | 5 | 0 | 10 | 1 | 5 | −4 | 1 |
| 310 | 7 | 5 | 0 | 11 | 0 | 5 | −5 | 0 |
| 312 | 12 | 0 | 0 | 5 | 6 | 0 | 6 | 11 |
| max | 12 | | | 11 | | | | |
| min | | | | | | | −5 | |

In implementations, the level adjustment for the speakers 304-312 in the environment with or without a reference position are detailed in Table T2. For example, in the first instance 326 of the environment, and with "no reference", a minimum distance can be identified, and ratios to that distance calculated, as indicated in the "Ratio to Min" column for environment instance 326 in Table T2. The "Level Change–20 log" column can be calculated, and a max level change identified and normalized to zero (or other value), as indicated in the "Level Change–Norm" column. In an implementation, applying 20 log of the ratio is an execution that would adjust the level by this amount. Alternatively, the position can be defined as a reference, and the assumed level change is learned, as indicated in the "Assumed Level Change–Ref" column. In the second instance 330 of the environment, and with "no reference", the steps described above can be followed and a normalized gain applied, as per the "Level Change–Norm" column. If there is a "reference", then these learned values in the "Assumed Level Change–Ref" column can be subtracted from the "no reference" column for a temporary new level change, as indicated in the "New Level Change–Pre-Norm" column. These values can then be normalized to zero (or other value) resulting in the "New Level Change–Norm" column, and the gain as indicate in the column can be applied.

TABLE T2

Level Adjustment

Environment Instance 326

| Speaker | Feet | Ratio to num | Lvl Change 20log | Lvl Change Norm | Ref Delay |
|---|---|---|---|---|---|
| 304 | 10 | 1.43 | 3.1 | −1.6 | 0 |
| 306 | 7 | 1.00 | 0.0 | −4.7 | 0 |
| 308 | 7 | 1.00 | 0.0 | −4.7 | 0 |
| 310 | 7 | 1.00 | 0.0 | −4.7 | 0 |
| 312 | 12 | 1.71 | 4.7 | 0.0 | 0 |
| max | | | 4.7 | | |
| min | 7 | | | | |

Environment Instance 330

| Speaker | Feet | Ratio to min | Lvl Change 20log | Lvl Change Norm | Assumed LvL Change Ref | New Lvl Pre-Norm | New Lvl Change Norm |
|---|---|---|---|---|---|---|---|
| 304 | 8 | 1.60 | 4.1 | −2.8 | −1.6 | −1.2 | −5.9 |
| 306 | 7 | 1.40 | 2.9 | −3.9 | −4.7 | 0.8 | −3.9 |
| 308 | 10 | 2.00 | 6.0 | −0.8 | −4.7 | 3.9 | −0.8 |
| 310 | 11 | 2.20 | 6.8 | 0.0 | −4.7 | 4.7 | 0.0 |
| 312 | 5 | 1.00 | 0.0 | −6.8 | 0.0 | −6.8 | −11.5 |
| max | | | 6.8 | | | 4.7 | |
| min | 5 | | | | | | |

Figure 4:
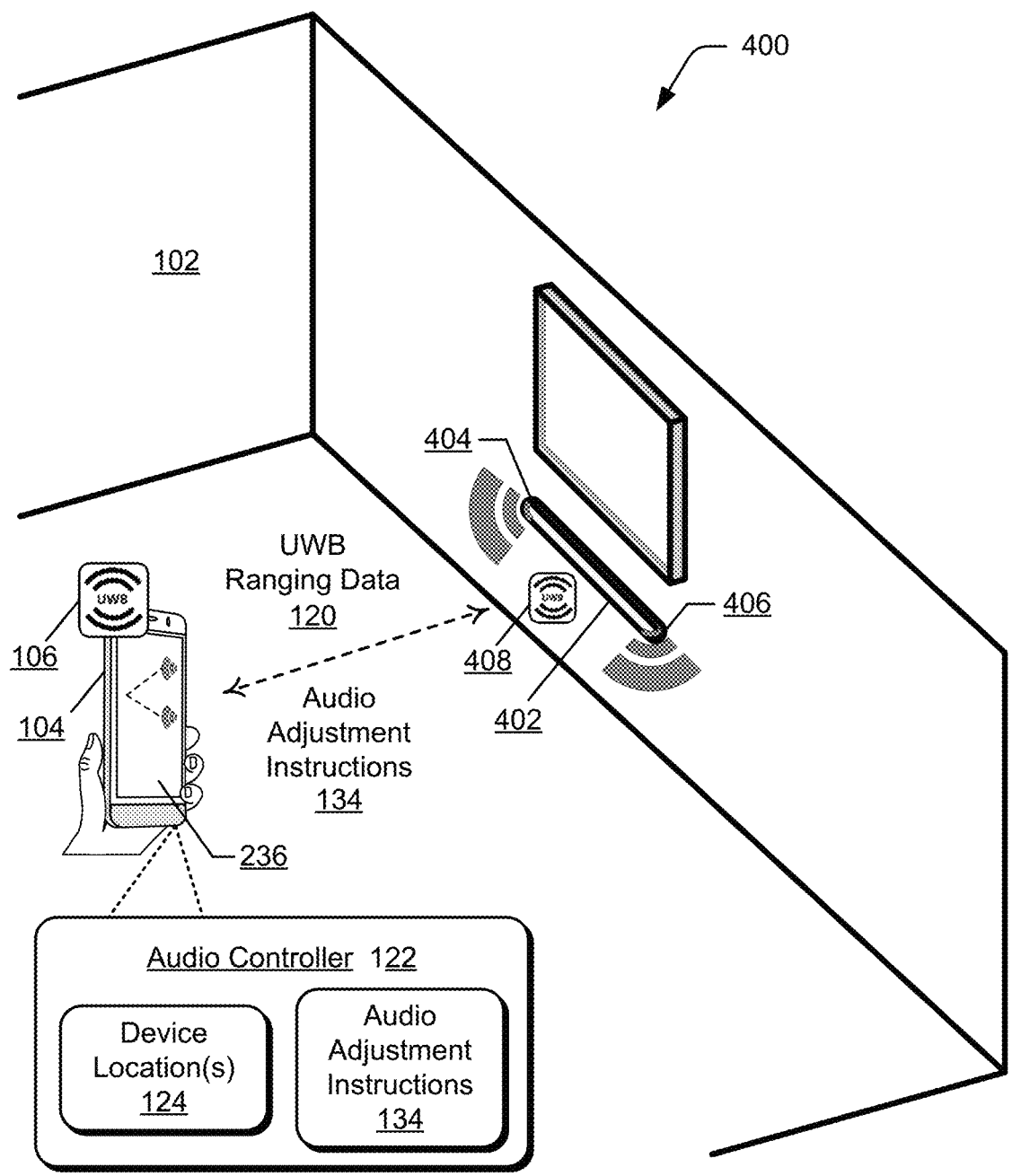

FIG. 4 illustrates an example 400 for audio level adjustment based on UWB, as described herein. In this example 400, the environment 102 includes the wireless device 104, which can be utilized to implement features and techniques of audio adjustment based on locations of the wireless device 104 in the environment. In this example 400, the environment 102 can include the wireless device 104, a soundbar 402 with speakers 404, 406 on opposite ends of the soundbar emitting audio, and a UWB radio 408 associated with the soundbar. The UWB radio 408 may be embedded in a UWB tag placed in the environment 102 proximate the soundbar 402, or the soundbar may be embedded with the UWB radio 408 such that the soundbar is UWB-enabled.

In implementations, the UWB radio 106 embedded in the wireless device 104 receives UWB ranging data 120 from the UWB radio 408 associated with the soundbar 402. In this example 400, the UWB radio 106 embedded in the wireless device 104 is communicatively linked to the UWB radio 408 associated with the soundbar 402, such that the UWB radio 106 receives the UWB ranging data 120 from the UWB radio 408. The audio controller 122 can utilize the UWB ranging data 120 received by the UWB radio 106 embedded in the wireless device 104 to monitor device location(s) 124 of the wireless device 104 relative to the speakers in the environment, such as relative to the speakers 404, 406 implemented in the soundbar 402. As noted above, the UWB ranging data 120 may be received from the UWB radios in the environment 102, such as from the UWB radio 408. The audio controller 122 can monitor the device location(s) 124 of the wireless device 104 relative to the speakers 404, 406 based on the UWB ranging data 120 and angle-of-arrival (AoA) data from the UWB radio 408 (e.g., given that the distance between the UWB radio 408 and each speaker 404, 406 is known).

In implementations, a single UWB radio, such as the UWB radio 408 can be placed at a fixed, arbitrary location to facilitate accurate location monitoring of the wireless device 104 relative to the speakers in the environment, such as the speakers 404, 406. In order to achieve accurate device location 124 monitoring of the wireless device 104 relative to the speakers 404, 406 implemented in the soundbar 402, the audio controller 122 may complete a training process to effectively learn the positions of the speakers 404, 406 in the environment 102, which may include a user utilizing the user interface 236 of the wireless device to complete this training process.

In implementations, the training process can consist of a user placing the wireless device 104 embedded with the UWB radio 106 at the location of the speakers 404, 406 in the environment, and the user interface 236 receiving input specifying that the wireless device is located proximate a specific speaker in the environment 102. In this example 400, the training process can consist of a user placing the wireless device 104 at a first speaker, such as the speaker 404. Once placed at the first speaker 404, the audio controller 122 can receive input via the user interface 236 to specify the UWB radio 106 is placed at the location of the first speaker. The audio controller 122 can then utilize the UWB ranging data 120 communicated between the UWB radio 106 and the UWB radio 408 in order to note and recall the device location 124 of the first speaker 404 relative to the UWB radio 408. This learning process can then be repeated for all the other speakers in the environment 102, such as for the speaker 406. The data collected during the learning process regarding the device locations 124 of the speakers in the environment 102 may be maintained in memory for subsequent recall and use by the audio controller 122.

In aspects of audio level adjustment based on UWB, the audio controller 122 may utilize the device locations 124 of the speakers 404, 406 in the environment 102, as well as the device locations of the wireless device 104 to determine and communicate the audio adjustment instructions 134, as described above in relation to FIGS. 1-3. For example, the audio controller 122 may monitor the device locations 124 of the wireless device 104 relative to the device locations of the speakers 404, 406 and determine a location change of the wireless device in the environment. The audio controller 122 may then determine a sound level adjustment to be included in the audio adjustment instructions 134 to reduce or to initiate a gain in the sound level of the audio emitting from the speaker 404 and/or from the speaker 406. The sound level adjustment(s) may be based on a ratio of subsequent distances to reference distances, a ratio of subsequent distances to an average distance, and/or a ratio of the distance to the right speaker to the distance to the left speaker, as further described in relation to FIGS. 1-3. The audio controller 122 may also determine a sound delay adjustment to be included in the audio adjustment instructions 134 to delay the audio emitting from one or more of the speakers 404, 406 in the environment 102. The sound delay adjustment may be based on the difference between a distance to the right speaker and the distance to a left speaker, and/or based on the difference between a subsequent distance and a reference distance, as described above in relation to FIG. 2.

Figure 5:
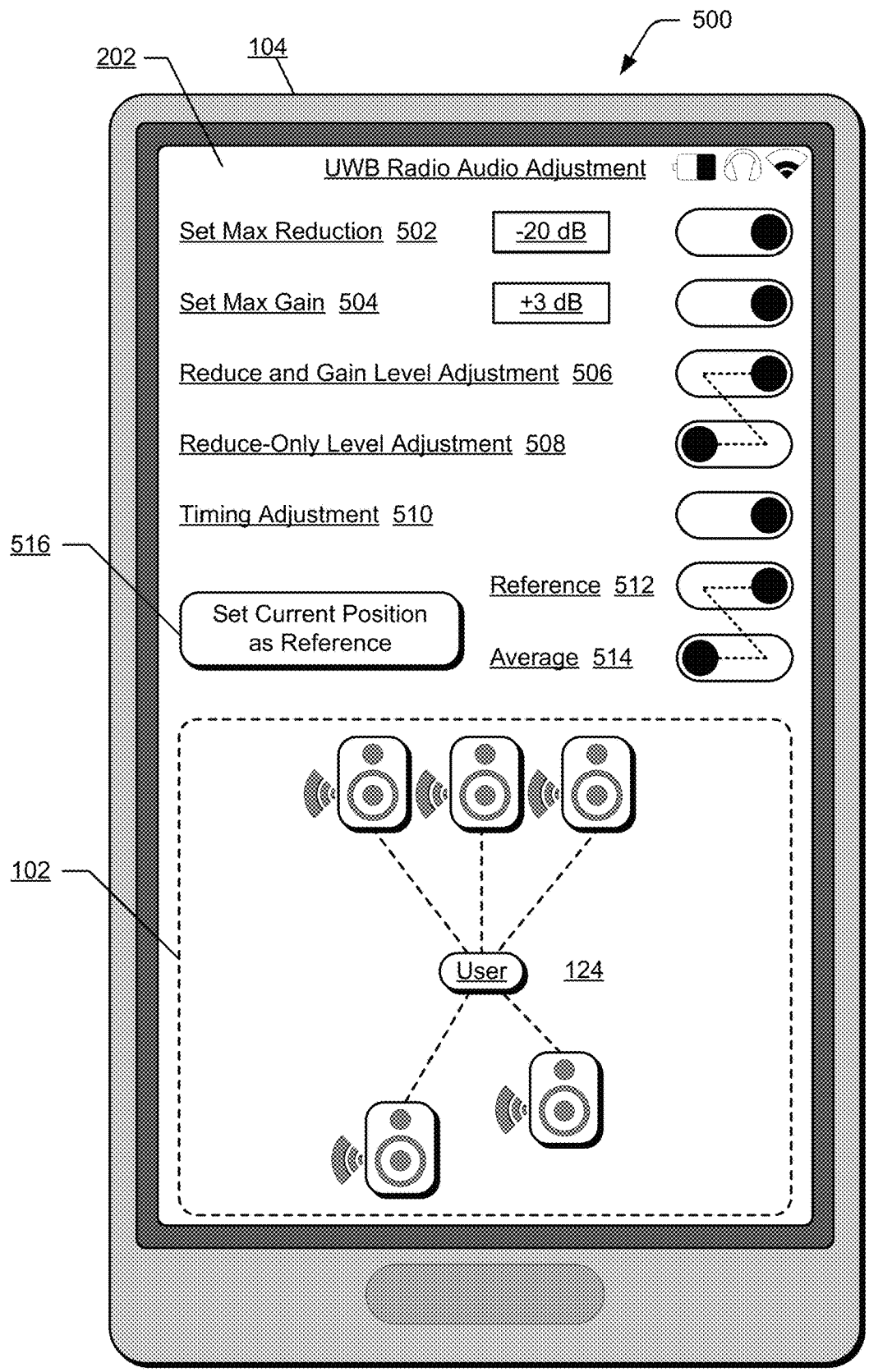
FIG. 5 illustrates an example user interface for audio adjustment based on UWB in accordance with one or more implementations described herein.

FIG. 5 illustrates an example user interface 500 for audio level adjustment based on UWB, as described herein. Generally, the user interface 500 may be presented on the display screen of the wireless device 104, which can be utilized to implement features and techniques of audio adjustment based on locations of the wireless device in the environment 102, such as shown and described with reference to FIG. 1. In this example user interface 500, the wireless device 104 such as a smartphone, mobile phone, or other type of mobile wireless device, has a display screen 202 on which the application user interface 500 may be displayed. Alternatively or in addition, the application user interface 500 can be presented on wireless device 104 as any type of wearable device such as a smart watch, a wearable 5G article, or any other type of wearable wireless device.

In implementations, the user interface 500 may be used to receive input specifying characteristics of the audio adjustment instructions 134. For example, the set maximum reduction toggle 502 is enabled on the example user interface 500. When this toggle 502 is enabled, a user is prompted to enter a minimum sound level that any speaker in the environment 102 must conform to. In this example, a user has entered −20 dB as the maximum reduction in sound level. The audio controller 122 may then determine audio adjustment instructions 134 that initiate to reduce a sound level of audio emitting from one or more speakers in the environment 102. If the reduction in the sound level of the speaker would reduce the sound level lower than the enabled maximum reduction toggle 502, the audio controller would adjust the sound level adjustment to reduce the sound level to the enabled maximum reduction, such as the −20 dB specified in the example user interface. Notably, the set maximum reduction toggle 502 is included in the user interface 500 such that the audio emitting from the speakers in the environment 102 is not reduced to a level that is quieter than a user's preference.

In implementations, the user interface 500 may be used to receive input specifying characteristics of the audio adjustment instructions 134. For example, the set maximum gain toggle 504 is enabled on the example user interface 500. When this toggle for maximum gain is enabled, a user is prompted to enter a maximum sound level that any speaker in the environment 102 must conform to. In this example, a user has entered +3 dB as the maximum gain. The audio controller 122 may then determine audio adjustment instructions 134 that initiate a gain in a sound level of audio emitting from one or more speaker in the environment 102. If the gain in the sound level of the speaker would increase the sound level more than the enabled maximum gain toggle 504, the audio controller would adjust the sound level adjustment to increase the sound level to the enabled maximum level, such as the +3 dB specified in the user interface. Notably, the set maximum gain toggle 504 is included in the user interface 500 such that the audio emitting from the speakers in the environment 102 does not increase to a level that is louder than a user's preference.

In implementations, the user interface 500 may include a toggle 506 to set the audio adjustment instructions 134 to include both reduce and gain sound level adjustments. When the reduce and gain toggle 506 is enabled the audio controller 122 can generate the audio adjustment instructions 134 to both reduce the sound level of audio emitting from one or more of the speakers in the environment 102, and initiate a gain in the sound level of the audio emitting from other speakers in the environment. The user interface 500 may also include a complementary toggle 508 to set the audio adjustment instructions 134 to include reduce-only sound level adjustments. In this example, the toggle 506 and the toggle 508 are linked so that if one is toggled, the other will toggle to the opposite setting (i.e., on or off). When the reduce-only toggle 508 is enabled, the audio controller 122 can generate the audio adjustment instructions 134 to only reduce the sound level of audio emitting from one or more of the speakers in the environment 102. The audio controller 122 accomplishes this by determining the audio adjustment instructions 134 to include both reduce and gain sound level adjustments, specifying the largest required gain sound level adjustment, and then shifting all of the sound level adjustments included in the instructions down by the largest required gain. For example, the audio controller 122 may initiate a +3 dB gain adjustment in sound level of the audio 110 emitting from the speaker 108, and initiate a −4 dB reduction in sound level of the audio 116 emitting from the speaker 114. The audio controller 122 specifies the +3 dB adjustment as the largest required gain sound level adjustment, and shifts all of the adjustments down by 3 dB. The audio adjustment instructions 134 then include a 0 dB adjustment to the audio 110 emitting from the speaker 108 (i.e., no adjustment to the levels) and a −7 dB reduction in sound level of the audio 116 emitting from the speaker 114.

In implementations, the user interface 500 may include a toggle 510 to enable timing adjustments of audio emitting from speakers in the environment 102. The timing adjustments may include adding a delay to nearer speakers, as described above in relation to FIG. 2. For example, the audio controller 122 may determine that there are two speakers emitting audio in the environment 102. The audio controller 122 can initiate a delay in the nearer speaker based on the difference in the distance to the right speaker and the distance to the left speaker. If the audio controller 122 determines there are more than two speakers in the environment 102, the audio controller can initiate a delay in the audio of speakers that have subsequent distances that are less than reference distances. The delay can be based on the difference between the reference distance and the subsequent distance.

In implementations, the user interface 500 may include toggles 512, 514 to set the audio adjustment instructions 134 to be based on reference distances from the wireless device 104 to speakers in the environment, or to be based on an average distance from the wireless device 104 to all speakers in the environment. In this example, the toggle 512 and the toggle 514 are linked so that if one is toggled, the other will toggle to the opposite setting (i.e., on or off). For example, if the user interface 500 receives input to enable the reference toggle 512, the audio controller 122 will determine the sound level adjustments 230 included in the audio adjustment instructions 134 based on a ratio of subsequent distances to corresponding reference distances, as described above in relation to FIGS. 1 and 2. Similarly, if the user interface 500 receives input to enable the average toggle 514, the audio controller 122 will determine the sound level adjustments 230 included in the audio adjustment instructions 134 based on a ratio of corresponding subsequent distances to an average distance, as described above in relation to FIGS. 1 and 2.

If the reference toggle 512 is enabled, as shown in the example user interface 500, a selectable control 516 will be available to receive input specifying the current device location 124 of the wireless device 104 as the user's preferred reference position. For example, the user interface 500 may show a pictorial or schematic diagram of the device locations 124 in the environment 102. A user may wish to set their current position as the reference position, which may be the user's preferred location to listen to audio emitting from the speakers in the environment 102 and/or the device location 124 depicted in the example user interface 500. The user interface 500 may receive input as the selectable control 516 to specify the current location 124 of the wireless device 104 to include reference distances from the wireless device to one or more of the speakers in the environment 102.

Example method 600 is described with reference to FIG. 6 in accordance with implementations for audio level adjustment based on UWB. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
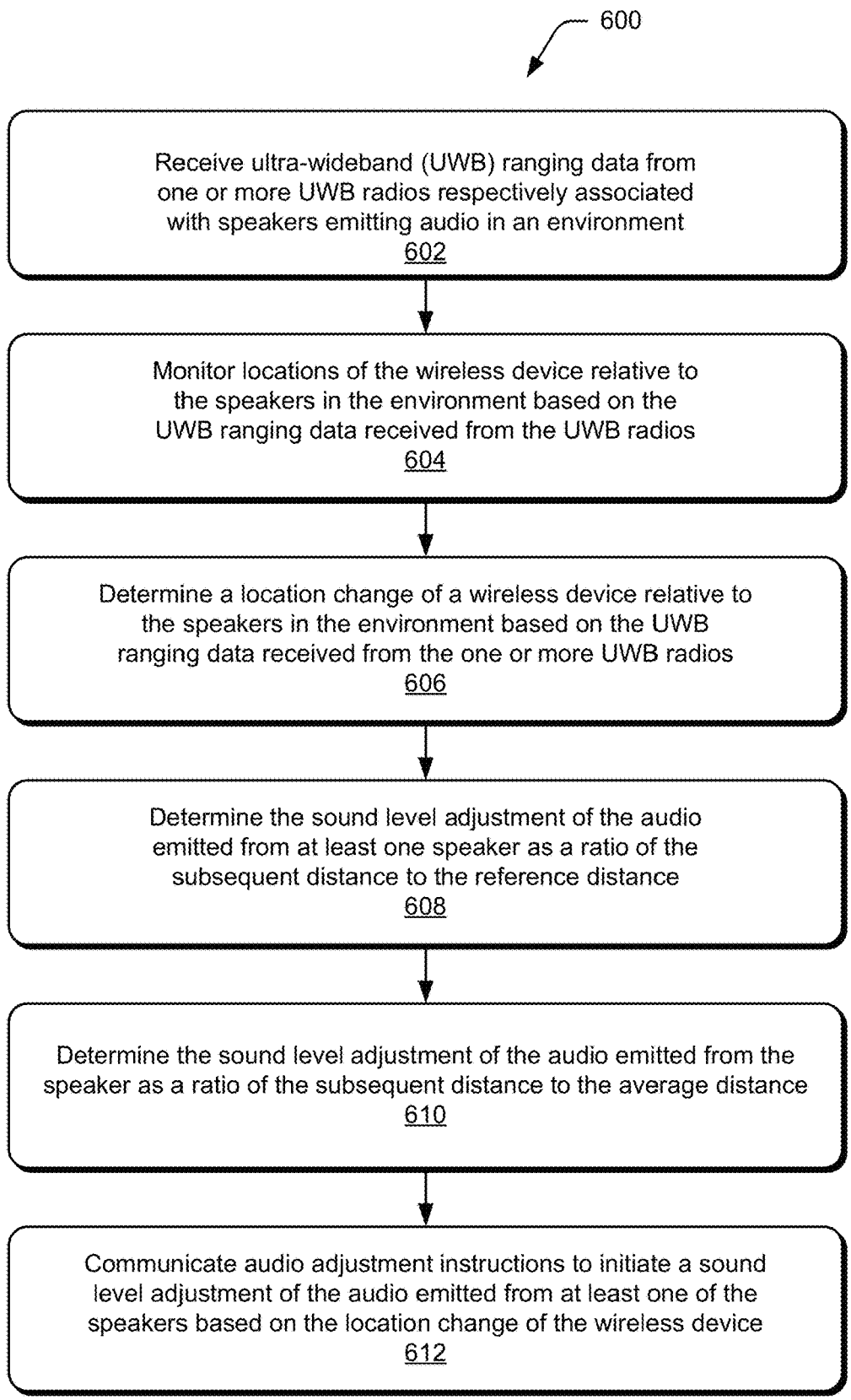
FIG. 6 illustrates an example method for audio level adjustment based on UWB in accordance with one or more implementations of the techniques described herein.

FIG. 6 illustrates example method(s) 600 for audio level adjustment based on UWB, and is generally described with reference to an automation controller implemented by a computing device. The order in which the method is described is not intended to be construed as a limitation, and any number or combination of the described method operations can be performed in any order to perform a method, or an alternate method.

At 602, ultra-wideband (UWB) ranging data is received from one or more UWB radios respectively associated with speakers emitting audio in an environment. For example, the wireless device 104 communicates, generally by wireless connection, with the UWB radios 112, 118 respectively associated with speakers 108, 114, and/or other UWB-enabled devices for UWB communication in the environment 102. Generally, the environment 102 includes the wireless device 104, speakers 108, 114 that have associated UWB radios 112, 118, as well as any number of the other types of electronic, computing, and/or communication devices 204 described herein. The UWB radios 112, 118 may be implemented in a tag placed proximate a speaker and/or be embedded in a speaker such that the speaker is UWB-enabled. The audio controller 122 implemented by the wireless device 104 receives the UWB ranging data 120 from the UWB radios 112, 118 in the environment.

At 604, locations of the wireless device relative to the speakers in the environment are monitored based on the UWB ranging data received from the one or more UWB radios. For example, the audio controller 122 utilizes the UWB ranging data 120 to determine the locations 124 and the relative positions 226 of the UWB radios. The audio controller 122 can then determine the device locations 124 of the wireless device 104 relative to the speakers 108, 114, and/or other non-tagged speakers in the environment 102. In implementations, a single UWB tag 212 can be placed at a fixed location to facilitate accurate location monitoring of the wireless device 104 relative to multiple speakers in the environment 102, as described above in relation to FIG. 4.

At 606, a location change of a wireless device relative to the speakers in the environment 102 is determined based on the UWB ranging data received from the one or more UWB radios. For example, the audio controller 122 implemented by the wireless device 104 determines a location change of the wireless device 104 relative to the speakers 210, 214 in the environment 102 based on the UWB ranging data 228 received from the UWB radios 216, 218. In implementations, the audio controller 122 determines the location change as the wireless device 104 moving from a first location 126 to a second location 130. In implementations, the first location 126 may be determined as a reference distance from the wireless device 104 to at least one speaker in the environment 102, a subsequent distance from the wireless device 104 to at least one speaker in the environment, and/or an average distance from the wireless device to all of the speakers. The second location 130 may be determined as a subsequent distance from the wireless device 104 to one or more speakers in the environment 102.

At 608, a sound level adjustment of the audio emitted from at least one speaker is determined as a ratio of the subsequent distance to the reference distance. For example, the audio controller 122 implemented by the wireless device 104 determines the first location 126 as a reference distance from wireless device 104 to at least one speaker in the environment 102. The audio controller 122 determines the second location 130 as a subsequent distance from the wireless device 104 to the speaker in the environment 102. The audio controller 122 can then take the ratio of the subsequent distances to the reference distances to determine a sound level adjustment of audio emitting from the speaker in the environment 102.

At 610, a sound level adjustment of the audio emitted from at least one speaker is determined as a ratio of the subsequent distance to the average distance. For example, the audio controller 122 implemented by the wireless device 104 determines the first location 126 as an average distance from wireless device 104 to all of the speakers in the environment 102. The audio controller 122 also determines the second location 130 as subsequent distances from the wireless device 104 to the speakers in the environment 102. The audio controller 122 can then take the ratio of the subsequent distances to the average distance to determine a sound level adjustment of audio emitting from the speaker in the environment 102.

At 612, audio adjustment instructions to initiate a sound level adjustment of the audio emitted from at least one of the speakers based on the location change of the wireless device are communicated. For example, the audio controller 122 includes the sound level adjustments determined at 608 and/or at 610 in the audio adjustment instructions 134. The audio controller 122 can communicate the audio adjustment instructions 134 to one or more speakers in the environment 102 and/or to a central device controlling the audio emitting from the speakers in the environment, such as an amplifier device. In implementations, the audio adjustment instructions may be utilized to adjust audio from the wireless device as the source of the media that results in the audio being emitted from the speakers. For example, the wireless device 104 may communicate an audio data stream for playback through the speakers, such as in a Bluetooth broadcast implementation, a home networking media environment, or similar, and the audio adjustment instructions can control the volume at the wireless device to adjust the audio level of the audio that is emitted from the speakers in the environment.

The sound level adjustment may initiate to reduce the audio emitting from one or more speakers in the environment 102, such as the audio 116 emitting from the speaker 114. The sound level adjustment may also initiate a gain in the audio emitting from one or more speakers in the environment 102, such as the audio 110 emitting from the speaker 108. The audio adjustment instructions 134 may also include a sound delay adjustment in the audio emitted from at least one of the speakers in response to the subsequent distance from the wireless device to the speaker being at a different distance than the reference distance. The sound delay adjustment is determined such that the audio emitted from the speakers (e.g., the audio 110 emitting from the speaker 108 and the audio 116 emitting from the speaker 114) arrive at the wireless device 104 coincidentally.

Figure 7:
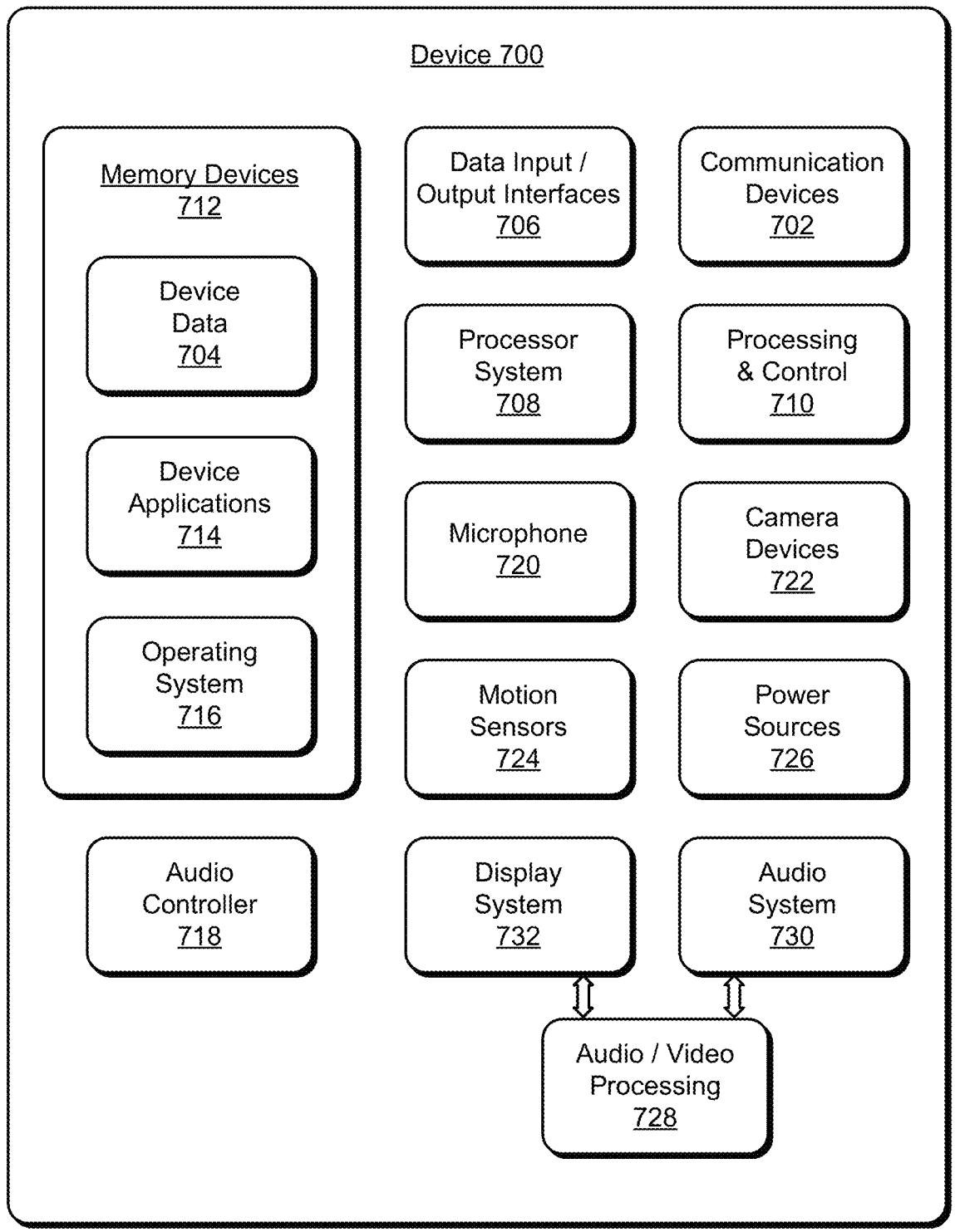
FIG. 7 illustrates various components of an example device that can be used to implement the techniques for audio level adjustment based on UWB as described herein.

FIG. 7 illustrates various components of an example device 700, which can implement aspects of the techniques and features for audio level adjustment based on UWB, as described herein. The example device 700 can be implemented as any of the devices described with reference to the previous FIGS. 1-6, such as any type of a wireless device, mobile device, mobile phone, flip phone, client device, companion device, paired device, display device, tablet, computing, communication, entertainment, gaming, media playback, and/or any other type of computing and/or electronic device. For example, the wireless device 104 and/or a UWB tag 212 described with reference to FIGS. 1-6 may be implemented as the example device 700.

The example device 700 can include various, different communication devices 702 that enable wired and/or wireless communication of device data 704 with other devices. The device data 704 can include any of the various devices data and content that is generated, processed, determined, received, stored, and/or communicated from one computing device to another. Generally, the device data 704 can include any form of audio, video, image, graphics, and/or electronic data that is generated by applications executing on a device. The communication devices 702 can also include transceivers for cellular phone communication and/or for any type of network data communication.

The example device 700 can also include various, different types of data input/output (I/O) interfaces 706, such as data network interfaces that provide connection and/or communication links between the devices, data networks, and other devices. The I/O interfaces 706 can be used to couple the device to any type of components, peripherals, and/or accessory devices, such as a computer input device that may be integrated with the example device 700. The I/O interfaces 706 may also include data input ports via which any type of data, information, media content, communications, messages, and/or inputs can be received, such as user inputs to the device, as well as any type of audio, video, image, graphics, and/or electronic data received from any content and/or data source.

The example device 700 includes a processor system 708 of one or more processors (e.g., any of microprocessors, controllers, and the like) and/or a processor and memory system implemented as a system-on-chip (SoC) that processes computer-executable instructions. The processor system 708 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 710. The example device 700 may also include any type of a system bus or other data and command transfer system that couples the various components within the device. A system bus can include any one or combination of different bus structures and architectures, as well as control and data lines.

The example device 700 also includes memory and/or memory devices 712 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 712 include volatile memory and non-volatile memory, fixed and removable media devices, and any suitable memory device or electronic data storage that maintains data for computing device access. The memory devices 712 can include various implementations of random-access memory (RAM), read-only memory (ROM), flash memory, and other types of storage media in various memory device configurations. The example device 700 may also include a mass storage media device.

The memory devices 712 (e.g., as computer-readable storage memory) provide data storage mechanisms, such as to store the device data 704, other types of information and/or electronic data, and various device applications 714 (e.g., software applications and/or modules). For example, an operating system 716 can be maintained as software instructions with a memory device 712 and executed by the processor system 708 as a software application. The device applications 714 may also include a device manager, such as any form of a control application, software application, signal-processing and control module, code that is specific to a particular device, a hardware abstraction layer for a particular device, and so on.

In this example, the device 700 includes an audio controller 718 that implements various aspects of the described features and techniques for audio level adjustment based on UWB. The audio controller 718 can be implemented with hardware components and/or in software as one of the device applications 714, such as when the example device 700 is implemented as the wireless device 104 as described with reference to FIGS. 1-6. An example of the audio controller 718 includes the audio controller 122 that is implemented by the wireless device 104, such as a software application and/or as hardware components in the computing device. In implementations, the audio controller 718 may include independent processing, memory, and logic components as a computing and/or electronic device integrated with the example device 700.

The example device 700 can also include a microphone 720 and/or camera devices 722, as well as motion sensors 724, such as may be implemented as components of an inertial measurement unit (IMU). The motion sensors 724 can be implemented with various sensors, such as a gyroscope, an accelerometer, and/or other types of motion sensors to sense motion of the device. The motion sensors 724 can generate sensor data vectors having three-dimensional parameters (e.g., rotational vectors in x, y, and z-axis coordinates) indicating location, position, acceleration, rotational speed, and/or orientation of the device. The example device 700 can also include one or more power sources 726, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 700 can also include an audio and/or video processing system 728 that generates audio data for an audio system 730 and/or generates display data for a display system 732. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 700. Alternatively, the audio system and/or the display system are external, peripheral components to the example device.

Although implementations for audio level adjustment based on UWB have been described in language specific to features and/or methods, the appended claims are not necessarily limited to the specific features or methods described. Rather, the specific features and methods are disclosed as example implementations for audio level adjustment based on UWB, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A wireless device, comprising: an ultra-wideband (UWB) radio to communicate with one or more UWB radios respectively associated with speakers emitting audio, the UWB radio configured to receive UWB ranging data from the one or more UWB radios; an audio controller implemented at least partially in hardware to: monitor locations of the wireless device relative to the speakers based on the UWB ranging data received from the one or more UWB radios; and communicate audio adjustment instructions to initiate a sound level adjustment of the audio emitted from at least one of the speakers based on the locations of the wireless device relative to the speakers.

Alternatively or in addition to the above described wireless device, any one or combination of: the locations of the wireless device include a first location determined as a reference distance from the wireless device to the at least one speaker and at least a second location determined as a subsequent distance from the wireless device to the at least one speaker. The audio adjustment instructions to initiate the sound level adjustment of the audio emitted from the at least one speaker are based on a ratio of the subsequent distance to the reference distance. The audio adjustment instructions include initiating a delay in the audio emitted from the at least one speaker in response to the subsequent distance from the wireless device to the at least one speaker is at a different distance than the reference distance. The locations of the wireless device include a first location determined as an average distance from the wireless device to all of the speakers and at least a second location determined as a subsequent distance from the wireless device to the at least one speaker. The audio adjustment instructions to initiate the sound level adjustment of the audio emitted from the at least one speaker are based on a ratio of the subsequent distance to the average distance. The audio adjustment instructions are communicated to the at least one speaker to initiate the sound level adjustment of the audio emitted from the at least one speaker. The audio adjustment instructions are communicated to an amplifier controlling the at least one speaker to initiate the sound level adjustment of the audio emitted from the at least one speaker. A user interface configured to receive a position input specifying a reference position of the wireless device relative to the speakers, and at least one of: receive an adjustment input specifying the sound level adjustment as a reduce-only sound level adjustment; or receive the adjustment input specifying the sound level adjustment as a reduce and gain sound level adjustment. The wireless device includes a media source of the audio emitted from the speakers, and the audio adjustment instructions initiate the sound level adjustment of the media source at the wireless device to control the audio emitted from the at least one speaker.

A method, comprising: receiving ultra-wideband (UWB) ranging data from one or more UWB radios respectively associated with speakers emitting audio in an environment; determining a location change of a wireless device relative to the speakers in the environment based on the UWB ranging data received from the one or more UWB radios; and communicating audio adjustment instructions to initiate a sound level adjustment of the audio emitted from at least one of the speakers based on the location change of the wireless device.

Alternatively or in addition to the above described method, any one or combination of: monitoring locations of the wireless device relative to the speakers in the environment based on the UWB ranging data received from the one or more UWB radios. The location change includes determining the wireless device moved from a first location to at least a second location; the first location determined as one of a reference distance from the wireless device to the at least one speaker, as reference distances to all of the speakers, or as an average distance from the wireless device to all of the speakers; and the second location determined as a subsequent distance from the wireless device to the at least one speaker. The method further comprising determining the sound level adjustment of the audio emitted from the at least one speaker as a ratio of the subsequent distance to the reference distance. The method further comprising determining the sound level adjustment of the audio emitted from the at least one speaker as a ratio of the subsequent distance to the average distance. The method further comprising initiating a delay in the audio emitted from the at least one speaker in response to the subsequent distance from the wireless device to the at least one speaker is at a different distance than the reference distance.

A system, comprising one or more ultra-wideband (UWB) radios respectively associated with speakers emitting audio and a wireless device in an environment; an audio controller implemented at least partially in hardware to: receive UWB ranging data from the one or more UWB radios respectively associated with the speakers; monitor locations of the wireless device relative to the speakers in the environment based on the UWB ranging data received from the one or more UWB radios; determine a location change of the wireless device relative to the speakers; and initiate to adjust a sound level of the audio emitted from at least one of the speakers based on the location change of the wireless device.

Alternatively or in addition to the above described system, any one or combination of: the location change includes the wireless device moved from a first location to at least a second location, and the audio controller is configured to: determine the first location as one of a reference distance from the wireless device to the at least one speaker, or as an average distance from the wireless device to all of the speakers; and determine the second location as a subsequent distance from the wireless device to the at least one speaker. The sound level of the audio emitted from the at least one speaker is adjusted based on a ratio of the subsequent distance to the reference distance. The sound level of the audio emitted from the at least one speaker is adjusted based on a ratio of the subsequent distance to the average distance.

The invention claimed is:

1. A wireless device, comprising:
an ultra-wideband (UWB) radio to communicate with one or more UWB radios respectively associated with speakers emitting audio, the UWB radio configured to receive UWB ranging data from the one or more UWB radios; and
an audio controller implemented at least partially in hardware to:
monitor locations of the wireless device relative to the speakers based on the UWB ranging data received from the one or more UWB radios;
identify at least one speaker that is closer to the wireless device than at least one other speaker based on comparing the locations of the wireless device relative to the speakers; and
communicate audio adjustment instructions to initiate a sound level adjustment of the audio emitted from the at least one speaker based on a ratio of a distance from the wireless device to the at least one speaker to an average distance from the wireless device to the speakers, the sound level adjustment including increasing a volume of the at least one speaker while decreasing a volume of the at least one other speaker relative to the volume of the at least one speaker as the wireless device moves closer to the at least one speaker.

2. The wireless device of claim 1, wherein the locations of the wireless device include a first location determined as a reference distance from the wireless device to the at least one speaker and at least a second location determined as a subsequent distance from the wireless device to the at least one speaker.

3. The wireless device of claim 2, wherein the audio adjustment instructions to initiate the sound level adjustment of the audio emitted from the at least one speaker are based on a ratio of the subsequent distance to the reference distance.

4. The wireless device of claim 2, wherein the audio adjustment instructions include initiating a delay in the audio emitted from the at least one speaker in response to the subsequent distance from the wireless device to the at least one speaker is at a different distance than the reference distance.

5. The wireless device of claim 1, wherein the locations of the wireless device include a first location determined as the average distance from the wireless device to the speakers and at least a second location determined as a subsequent distance from the wireless device to the at least one speaker.

6. The wireless device of claim 1, wherein the audio adjustment instructions are communicated to the at least one speaker to initiate the sound level adjustment of the audio emitted from the at least one speaker.

7. The wireless device of claim 1, wherein the audio adjustment instructions are communicated to an amplifier controlling the at least one speaker to initiate the sound level adjustment of the audio emitted from the at least one speaker.

8. The wireless device of claim 1, further comprising a user interface configured to receive a position input specifying a reference position of the wireless device relative to the speakers, and at least one of:
receive an adjustment input specifying the sound level adjustment as a reduce-only sound level adjustment; or
receive the adjustment input specifying the sound level adjustment as a reduce and gain sound level adjustment.

9. The wireless device of claim 1, wherein the wireless device includes a media source of the audio emitted from the speakers, and the audio adjustment instructions initiate the sound level adjustment of the media source at the wireless device to control the audio emitted from the at least one speaker.

10. The wireless device of claim 1, wherein the sound level adjustment is between a minimum sound level and a maximum sound level.

11. A method, comprising:
receiving ultra-wideband (UWB) ranging data from one or more UWB radios respectively associated with speakers emitting audio in an environment;
determining a location change of a wireless device relative to the speakers in the environment based on the UWB ranging data received from the one or more UWB radios;
identifying at least one speaker that is closer to the wireless device than at least one other speaker based on comparing the location change of the wireless device relative to the speakers; and
communicating audio adjustment instructions to initiate a sound level adjustment of the audio emitted from the at least one speaker based on a ratio of a distance from the wireless device to the at least one speaker to an average distance from the wireless device to the speakers, the sound level adjustment including decreasing a volume of the at least one speaker while increasing a volume of the at least one other speaker relative to the volume of the at least one speaker as the wireless device moves closer to the at least one speaker.

12. The method of claim 11, further comprising monitoring locations of the wireless device relative to the speakers in the environment based on the UWB ranging data received from the one or more UWB radios.

13. The method of claim 11, wherein:
the location change includes determining the wireless device moved from a first location to at least a second location;
the first location determined as one of a reference distance from the wireless device to the at least one speaker, as reference distances to all of the speakers; and
the second location determined as a subsequent distance from the wireless device to the at least one speaker.

14. The method of claim 13, further comprising initiating a delay in the audio emitted from the at least one speaker in response to the subsequent distance from the wireless device to the at least one speaker is at a different distance than the reference distance.

15. The method of claim 13, wherein the sound level adjustment of the audio emitted from the at least one speaker is based on a ratio of the subsequent distance to the average distance.

16. The method of claim 11, wherein the sound level adjustment is between a minimum sound level and a maximum sound level.

17. A system, comprising:
one or more ultra-wideband (UWB) radios respectively associated with speakers emitting audio and a wireless device in an environment; and
an audio controller implemented at least partially in hardware to:
receive UWB ranging data from the one or more UWB radios respectively associated with the speakers;
monitor locations of the wireless device relative to the speakers in the environment based on the UWB ranging data received from the one or more UWB radios;
determine a location change of the wireless device relative to the speakers;
identify at least one speaker that is closer to the wireless device than at least one other speaker based on comparing the location change of the wireless device relative to the speakers; and
initiate a sound level adjustment of the audio emitted from the at least one speaker based on a ratio of a distance from the wireless device to the at least one speaker to an average distance from the wireless device to the speakers, the sound level adjustment including increasing or decreasing a volume of the at least one speaker while adjusting a volume of the at least one other speaker relative to the volume of the at least one speaker as the wireless device moves closer to the at least one speaker.

18. The system of claim 17, wherein the location change includes the wireless device moved from a first location to at least a second location, and the audio controller is configured to:
determine the first location as one of a reference distance from the wireless device to the at least one speaker; and
determine the second location as a subsequent distance from the wireless device to the at least one speaker.

19. The system of claim 18, wherein a sound level of the audio emitted from the at least one speaker is adjusted based on a ratio of the subsequent distance to the reference distance.

20. The system of claim 17, wherein the sound level adjustment is between a minimum sound level and a maximum sound level.

* * * * *